United States Patent
Okuda et al.

[19]

[11] Patent Number: 6,142,507
[45] Date of Patent: Nov. 7, 2000

[54] SIDE AIR BAG

[75] Inventors: Yorihito Okuda, Saitama; Takashi Murakami, Kanagawa; Kazumi Ono, Saitama, all of Japan

[73] Assignee: Kansei Corporation, Japan

[21] Appl. No.: 08/996,941

[22] Filed: Dec. 23, 1997

[30] Foreign Application Priority Data

Dec. 25, 1996 [JP] Japan .................................... 8-345285
Dec. 26, 1996 [JP] Japan .................................... 8-348097

[51] Int. Cl.$^7$ .................................................. B60R 21/16
[52] U.S. Cl. ..................................... 280/730.2; 280/743.1
[58] Field of Search ........................... 280/730.2, 730.1, 280/743.1, 743.2, 729

[56] References Cited

U.S. PATENT DOCUMENTS

| | | | |
|---|---|---|---|
| 5,378,019 | 1/1995 | Smith et al. . | |
| 5,421,610 | 6/1995 | Kavanaugh et al. . | |
| 5,586,782 | 12/1996 | Zimmerman, II et al. | 280/730.2 |
| 5,791,685 | 8/1998 | Lachat et al. | 280/743.1 |
| 5,803,485 | 9/1998 | Acker et al. | 280/728.2 |
| 5,829,779 | 11/1998 | Nakashima et al. | 280/730.2 |
| 5,890,732 | 4/1999 | Nakamura et al. | 280/729 |
| 5,895,070 | 4/1999 | Lachat | 280/730.2 |

FOREIGN PATENT DOCUMENTS

| | | | |
|---|---|---|---|
| 6-227348 | 8/1994 | Japan | 280/730.2 |
| 9-11845 | 1/1997 | Japan . | |
| 9-123864 | 5/1997 | Japan . | |
| 9-136598 | 5/1997 | Japan . | |
| 9-150705 | 6/1997 | Japan . | |

*Primary Examiner*—Paul N. Dickson
*Attorney, Agent, or Firm*—Morrison Law Firm

[57] ABSTRACT

A front and a back cloth body are bonded at the edges to form a bag. The bag is inflated from an air bag device disposed on a seat back so that it expands between a seat and a side door, thus protecting a passenger over a range from a torso to a head. The bag contains a supply section which holds an inflator that injects a pressurized fluid into the bag. A torso protection section, contiguous with the supply section, extends forward from the supply section. A head protection section, contiguous with the torso protection section, extends upward from the torso protection section. When the inflator is activated pressurized fluid is injected to expand head protection section. The resulting inflation pressure tends to make front side air bag pivot around the supply portion. To prevent this, in one embodiment an auxiliary section is inflated with a pressure in a direction opposite to the rotation at roughly the same time as the expansion of the head protection section. In another embodiment, the head protection section and the torso protection section are folded diagonally toward each other. In yet another embodiment, fuse stitches are used to delay the inflation of the head protection until after the torso protection section is inflated. The side air bag is then folded or rolled into the air bag device.

14 Claims, 18 Drawing Sheets

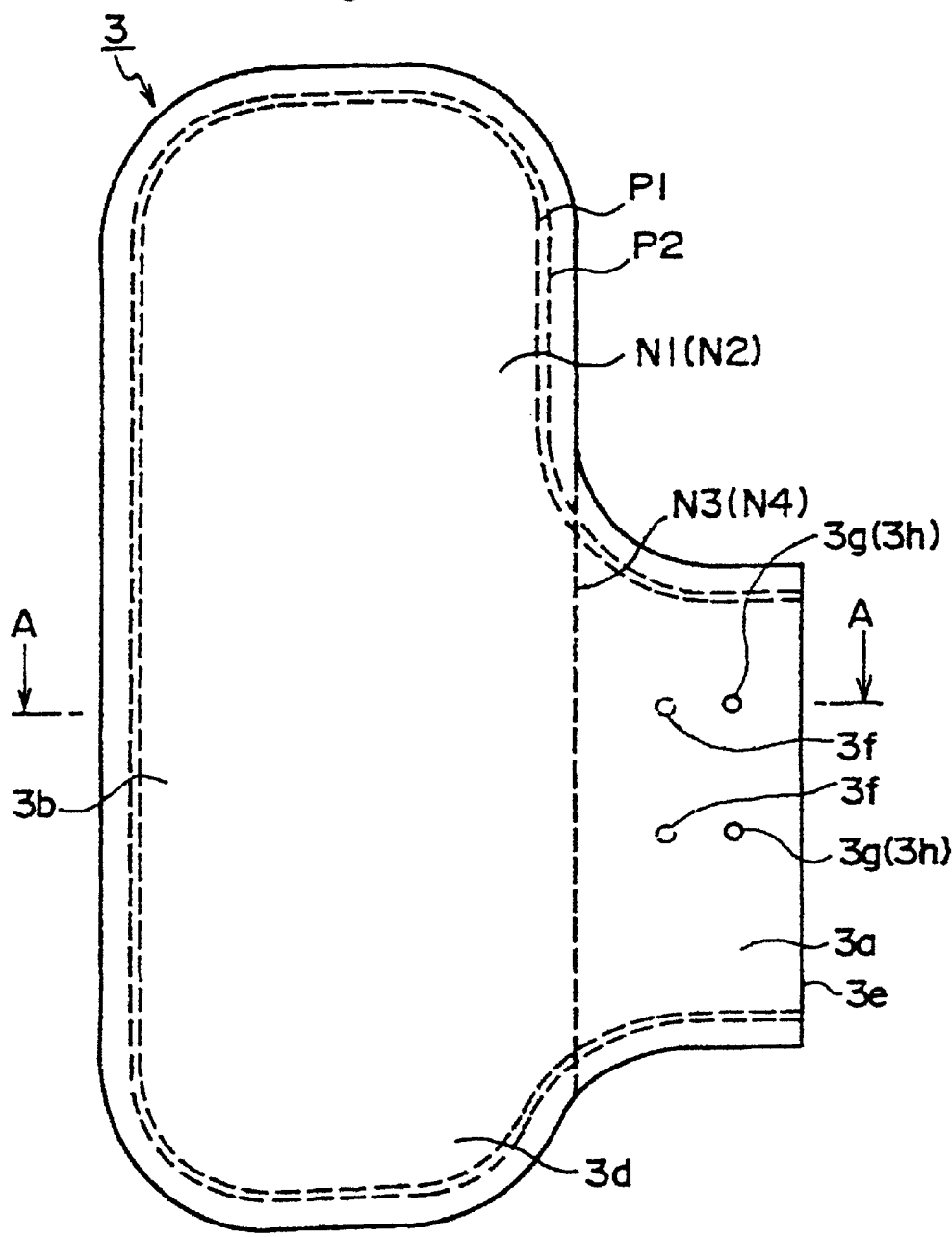
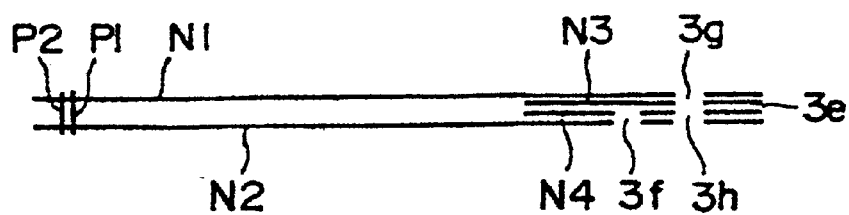

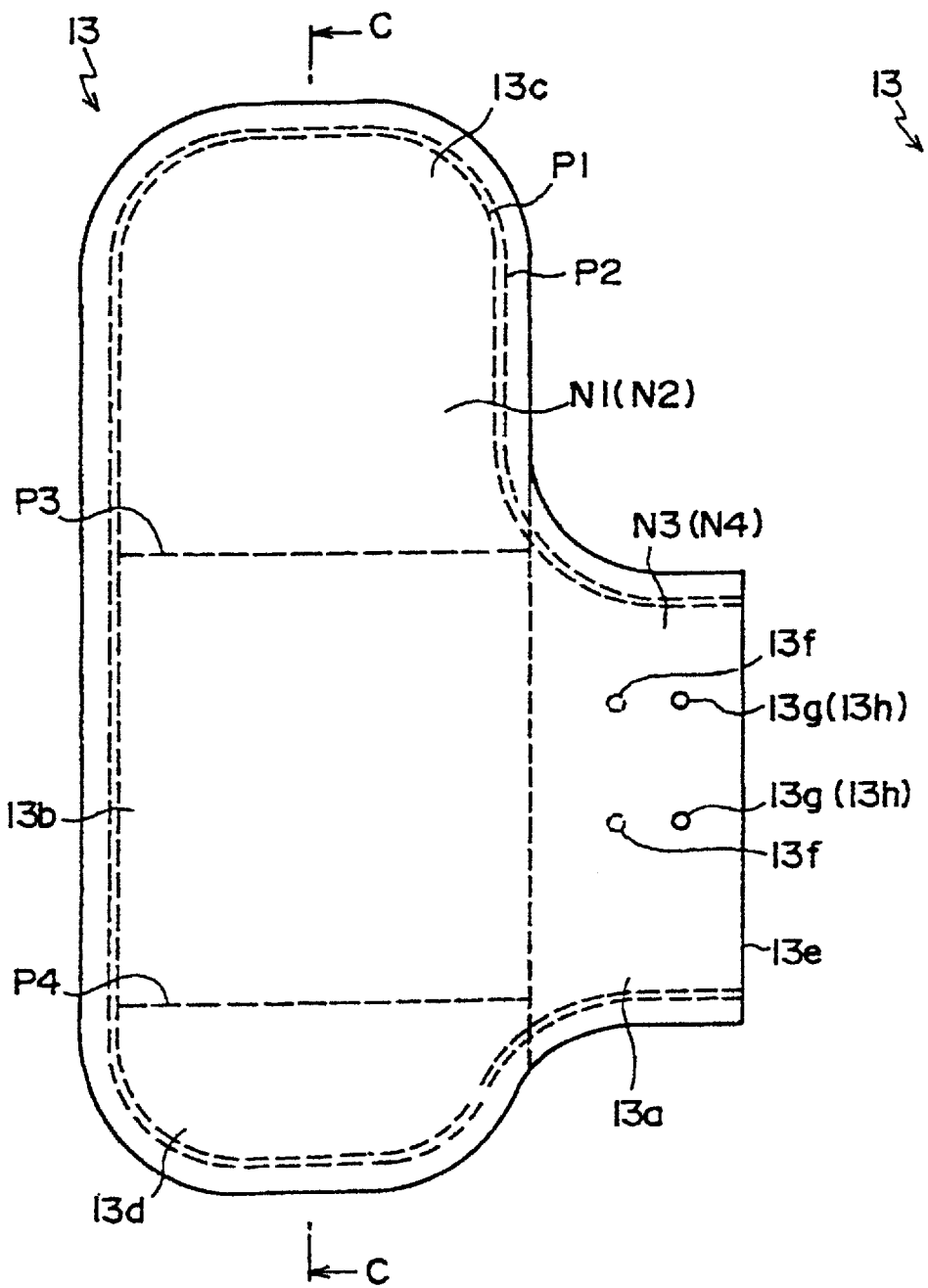
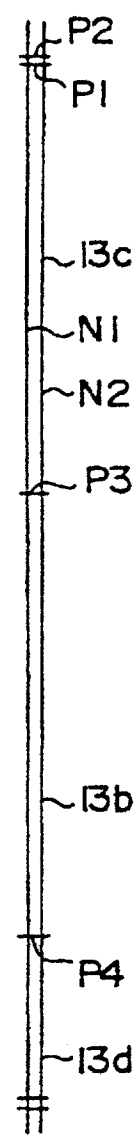
Fig. 4 (a)
Fig. 4 (b)

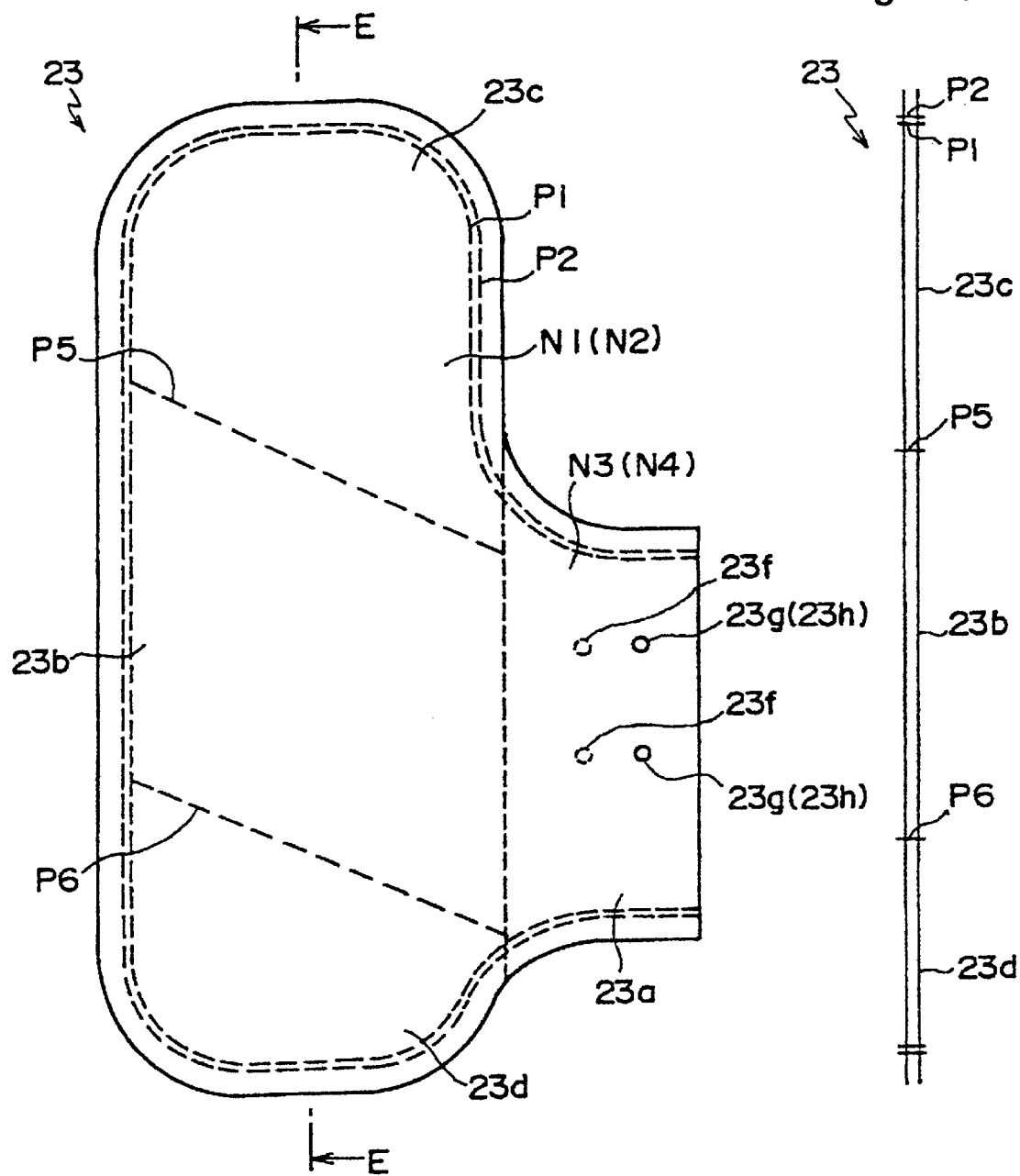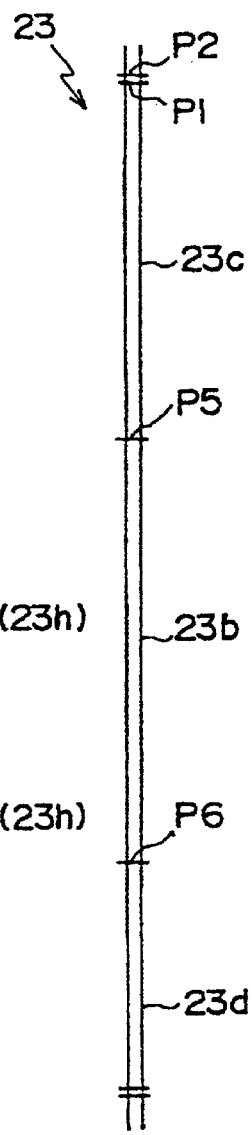
Fig. 6 (a)
Fig. 6 (b)

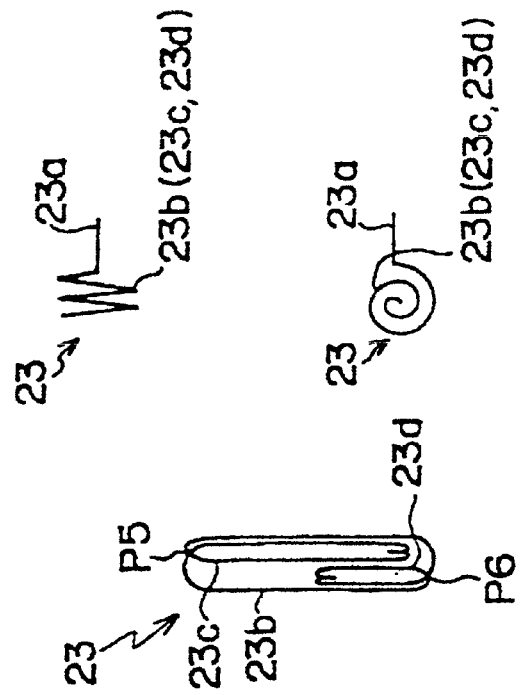
Fig. 7(a)
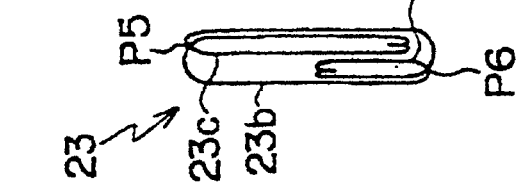
Fig. 7(b)
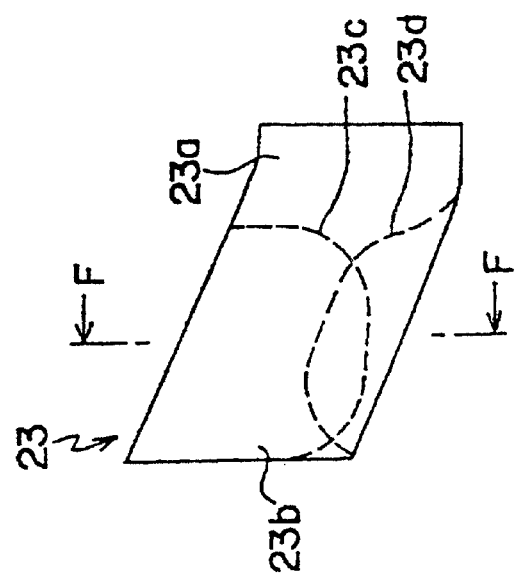
Fig. 7(c)
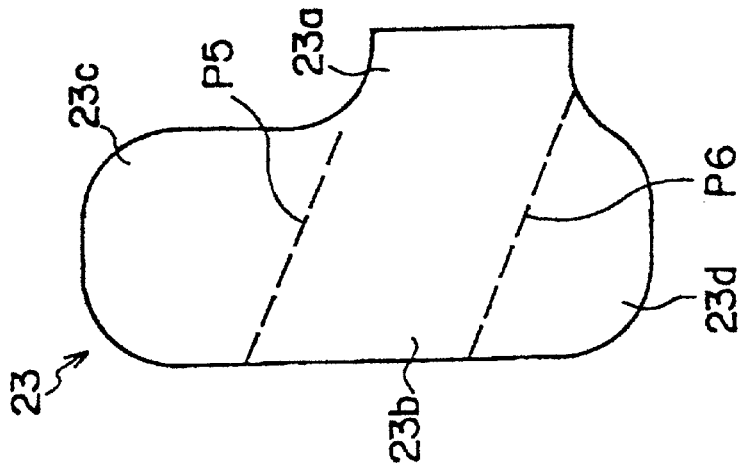
Fig. 7(d)
Fig. 7(e)

Fig. 8(a)
Fig. 8(b)
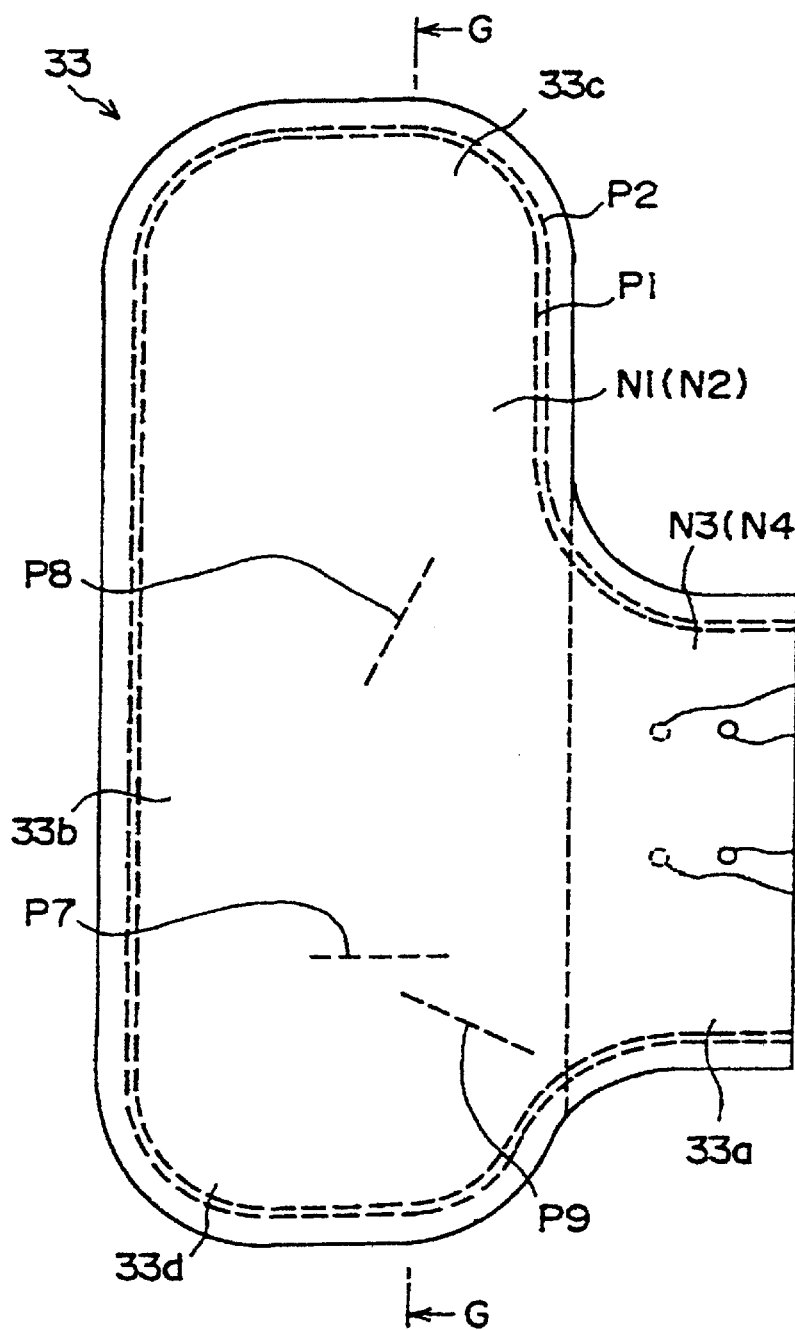
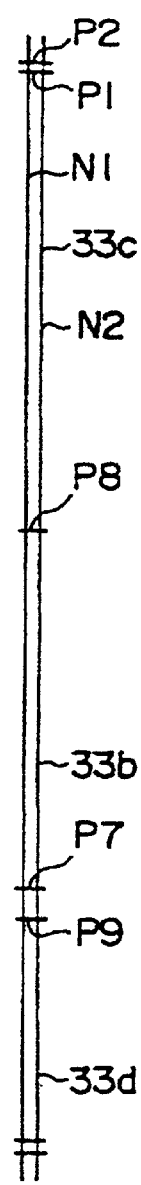

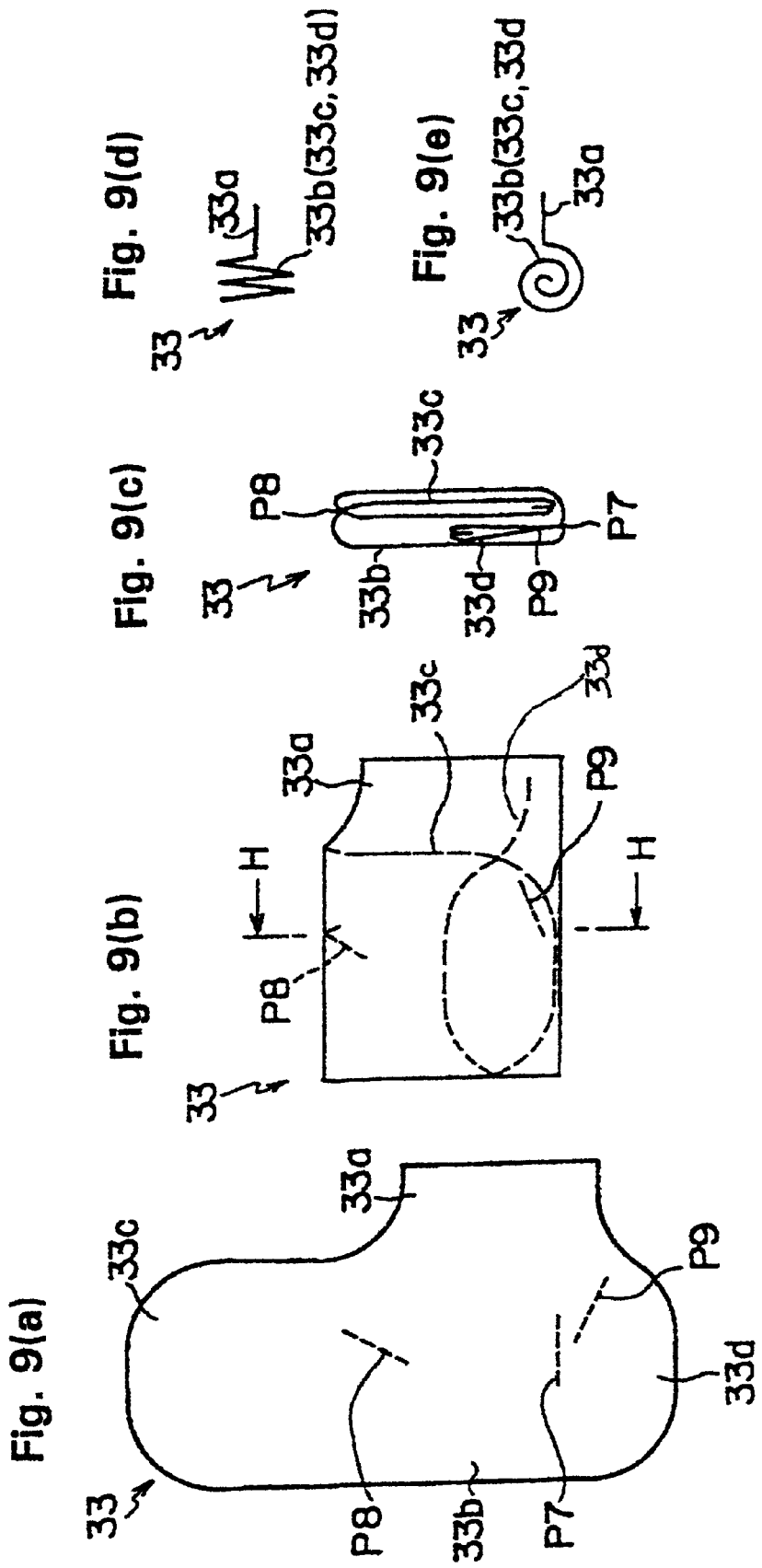

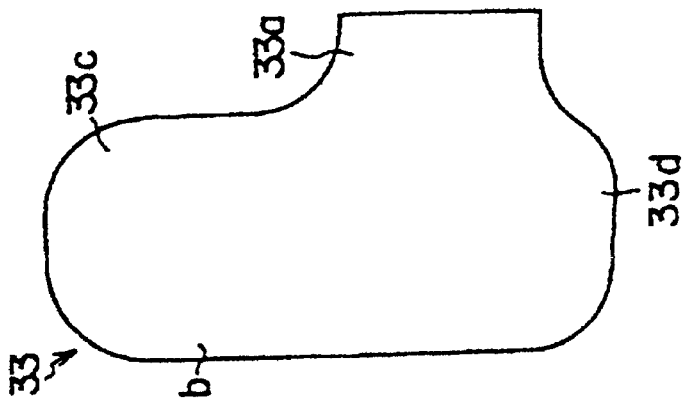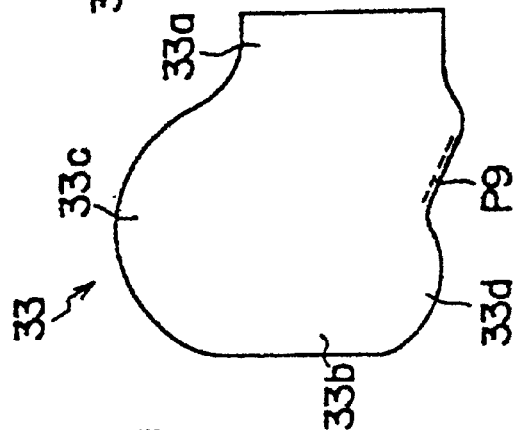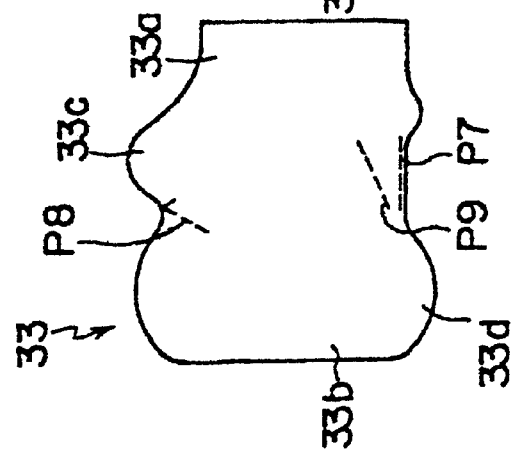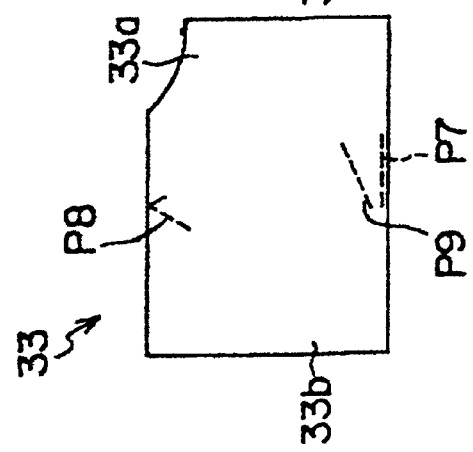

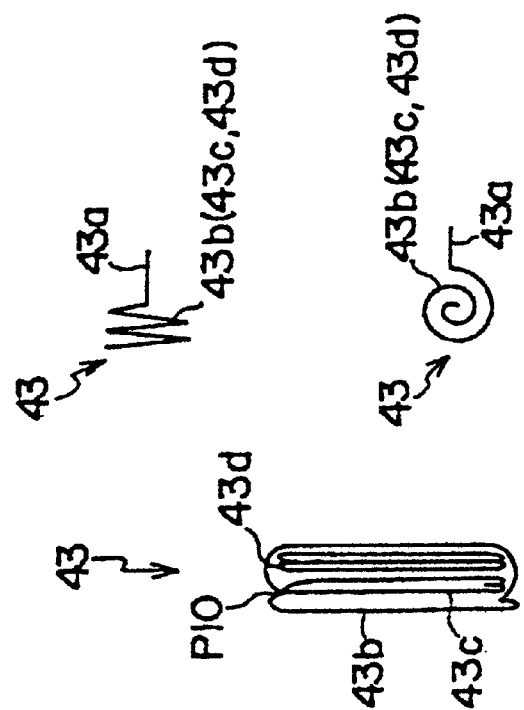
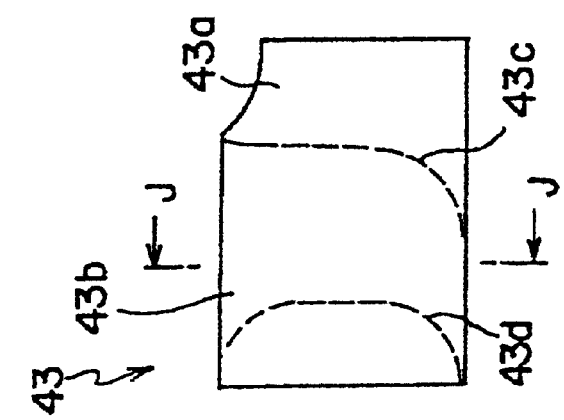
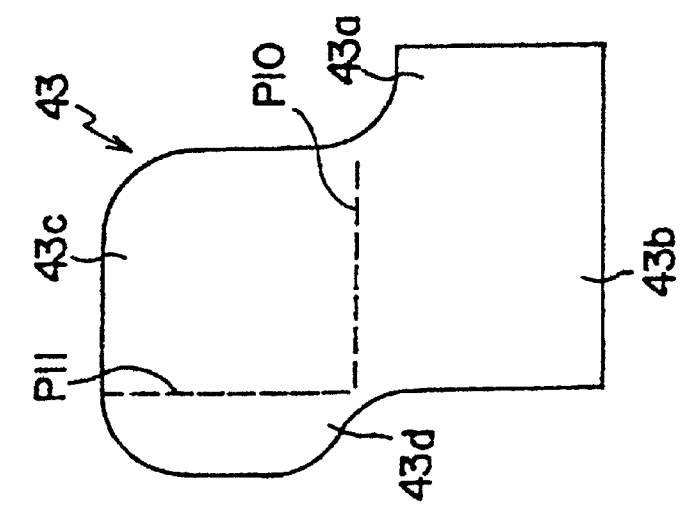
Fig. 13(a) Fig. 13(b) Fig. 13(c) Fig. 13(d) Fig. 13(e)

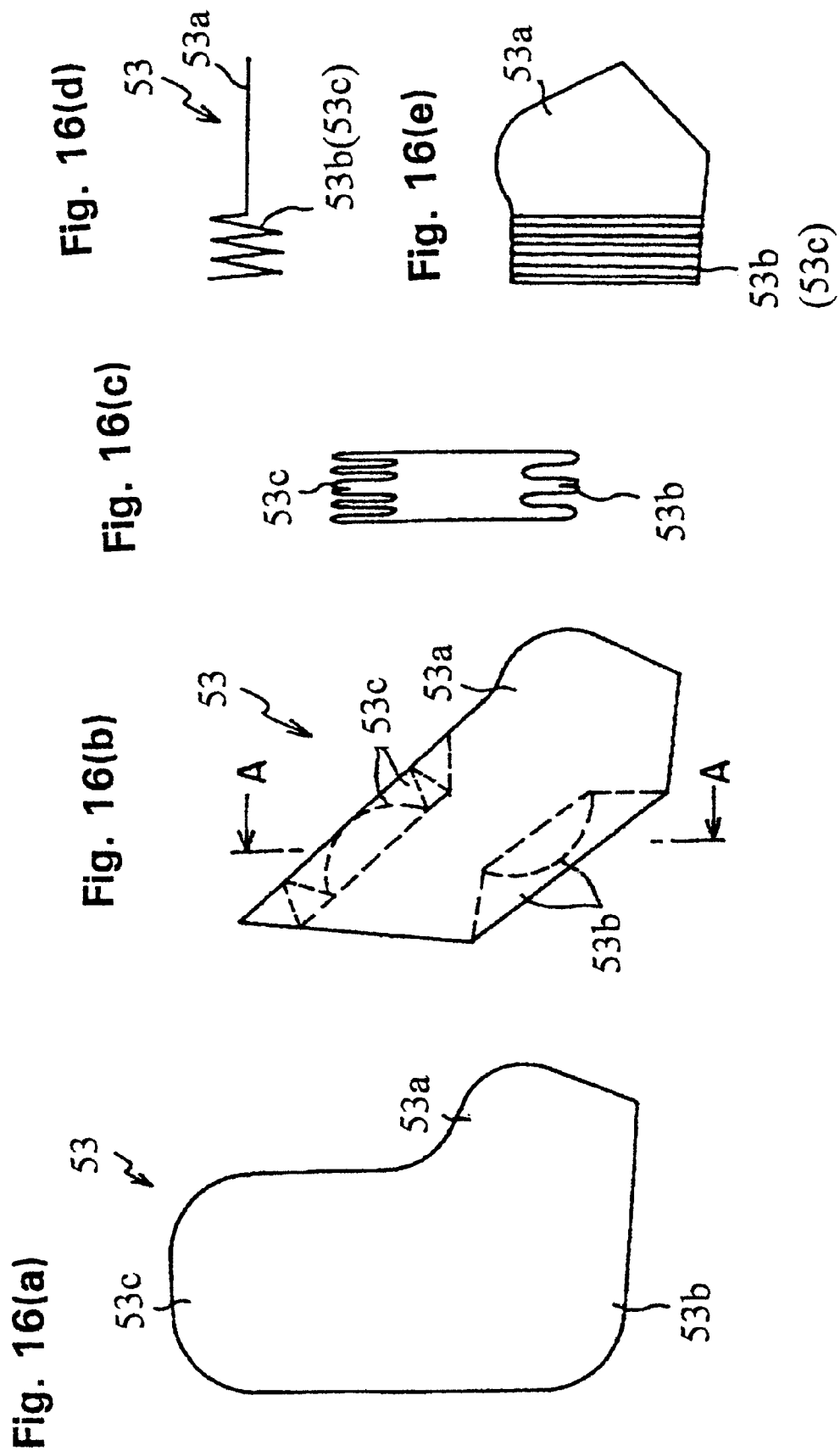

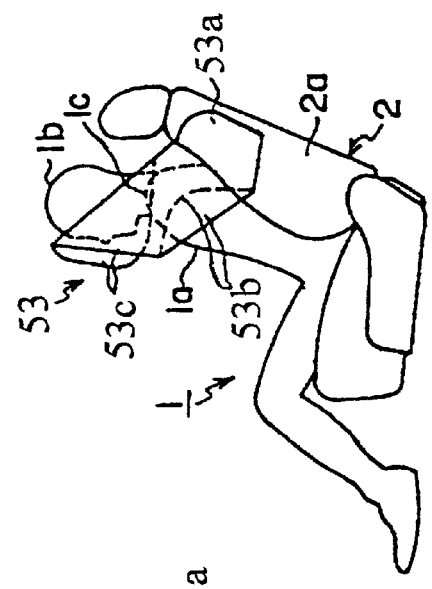
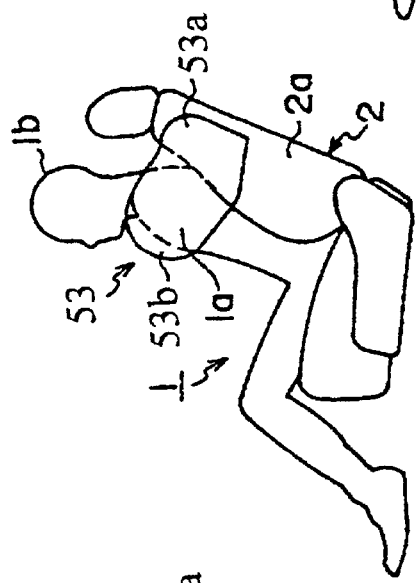
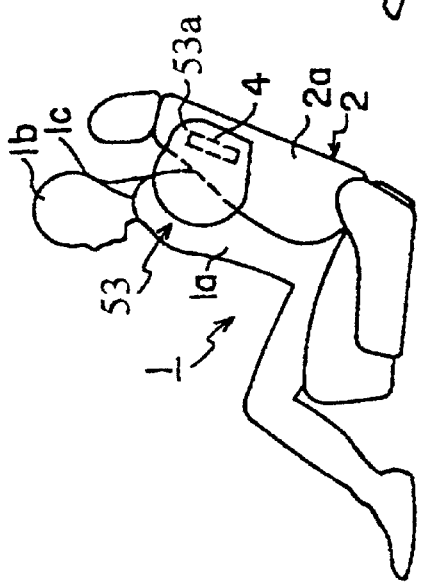
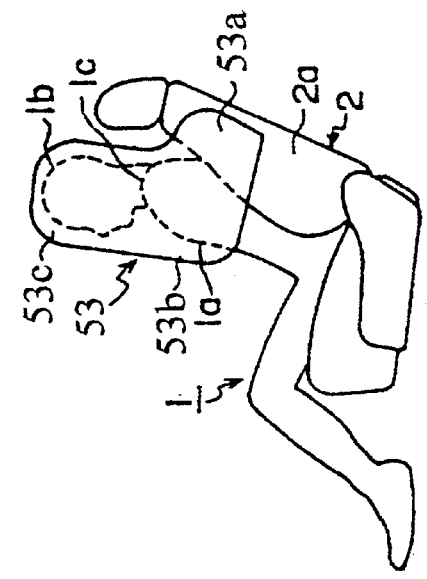
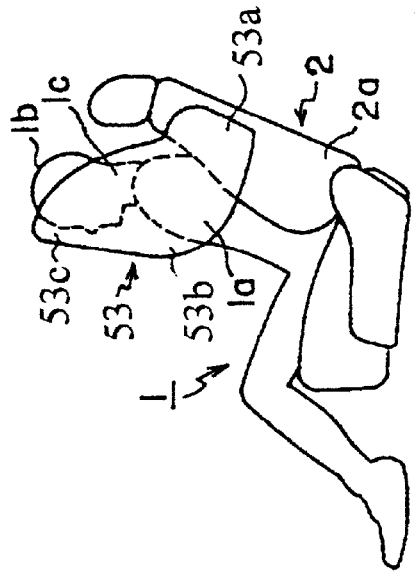

6,142,507

SIDE AIR BAG

BACKGROUND OF THE INVENTION

The present invention relates to a side air bag that protects the region from the head to the torso of a passenger. In the side air bag of the present invention, a front and back cloth body is bonded at the edges to form a bag. The air bag emerges from an air bag device disposed on a seat back and expands between a seat and a side door to protect an occupant especially in the event of a side impact.

Conventional responses to so-called "side collisions" have involved disposing an air bag device on the back of the front seat. A front side air bag is expanded from the air bag device via an injection of pressurized fluid that takes place when an inflator is activated. The front side air bag expands between the front seat and the front side door to protect the region from the torso to the head of the passenger.

In these front side air bags, it is necessary for the expanded air bag to avoid the shoulder seatbelt, which extends from the upper portion of the center pillar of the vehicle body, past the shoulder of the passenger, and to a lower position toward the center of the vehicle body. Furthermore, the distance between the front side door and the passenger is not uniform, i.e., the distance between the torso of the passenger and the front side door is different from the distance between the head of the passenger and the front side door.

OBJECTS AND SUMMARY OF THE INVENTION

It is an object of the present invention to provide a side air bag which overcomes the drawbacks of the prior art.

It is a further object of the present invention to provide a side air bag that inflates efficiently and reliably and that allows a compact inflator.

It is a still further object of the present invention to provide a side air bag with an auxiliary portion to prevent unwanted rotation of the side air bag.

It is another object of the present invention to provide a side air bag with fuse stitches which delay the inflation of a head protection section until after the inflation of a torso protection section.

It is sill another object of the present invention to provide a side air bag with time difference between the protection of an occupant's torso and protection of an occupant's head.

Briefly stated, a front and a back cloth body are bonded at the edges to form a bag. The bag is inflated from an air bag device disposed on a seat back so that it expands between a seat and a side door, thus protecting a passenger over a range from a torso to a head. The bag contains a supply section which holds an inflator that injects a pressurized fluid into the bag. A torso protection section, contiguous with the supply section, extends forward from the supply section. A head protection section, contiguous with the torso protection section, extends upward from the torso protection section. When the inflator is activated pressurized fluid is injected to expand head protection section. The resulting inflation pressure tends to make front side air bag pivot around the supply portion. To prevent this, in one embodiment an auxiliary section is inflated with a pressure in a direction opposite to the rotation at roughly the same time as the expansion of the head protection section. In another embodiment, the head protection section and the torso protection section are folded diagonally toward each other. In yet another embodiment, fuse stitches are used to delay the inflation of the head protection section until after the torso protection section is inflated. The side air bag is finally rolled or folded into the air bag device.

In an embodiment of the present invention a side air bag includes a bag with an open portion. An inflator is sealed within the open portion. A torso protection section is contiguous to and extends forward from the supply section. A head protection section is contiguous to and extends upward from the torso protection section. Preventing means prevents the head protection section from pivoting toward the open portion.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 4(a) is a front-view drawing of a side air bag according to a second embodiment of the present invention.

FIG. 4(b) is a cross-section drawing along the C—C line in FIG. 4(a).

FIG. 6(a) is a front-view drawing of a side air bag according to a third embodiment of the present invention.

FIG. 6(b) is a cross-section drawing along the E—E line in FIG. 5(a).

FIG. 7(a) is a front-view drawing of the side air bag according to the third embodiment of the present invention.

FIG. 7(b) is a front-view drawing of a front-side air bag in the stored state.

FIG. 7(c) is a cross-section drawing along the F—F line in FIG. 7(b) showing the side air bag in a stored state.

FIG. 7(d) is a plan drawing of a side air bag that has been folded like an accordion.

FIG. 7(e) is a front-view drawing of a side air bag that has been rolled

FIG. 8(a) is a front-view drawing of a side air bag according to a fourth embodiment of the present invention.

FIG. 8(b) is a cross-section drawing along the G—G line in FIG. 8(a).

FIG. 9(a) is a front-view drawing of the side air bag according to the fourth embodiment of the present invention.

FIG. 9(b) is a front-view drawing of a front-side air bag in the stored state.

FIG. 9(c) is a cross-section drawing along the H—H line in FIG. 9(b) showing the side air bag in a stored state.

FIG. 9(d) is a plan drawing of a side air bag that has been folded like an accordion.

FIG. 9(e) is a front-view drawing of a side air bag that has been folded like an accordion.

FIGS. 10(a)–10(d) show the expansion of a side air bag according to the fourth embodiment of the present invention. FIG. 10(a) is a drawing showing the normal resting state of the side air bag before it inflates from the air bag device.

FIG. 10(b) is a drawing showing the initial state after expansion.

FIG. 10(c) is a drawing showing the intermediate state after expansion.

FIG. 10(d) is a drawing showing the final state after expansion.

FIG. 13(a) is a front-view drawing of the side air bag according to the fifth embodiment of the present invention.

FIG. 13(b) is a front-view drawing of a front-side air bag in the stored state.

FIG. 13(c) is a cross-section drawing along the J—J line in FIG. 13(b) showing the side air bag in a stored state.

FIG. 13(d) is a plan drawing of a side air bag that has been folded like an accordion.

FIG. 13(e) is a front-view drawing of a side air bag that has been rolled up.

FIG. 16(a) in a front view showing another example of how the side air bag according to the sixth embodiment of the present invention can be stored in an air bag device.

FIG. 16(b) shows a front-view drawing of a front side air bag in the stored state.

FIG. 16(c) is a cross-section drawing along the A—A line in FIG. 16(b).

FIG. 16(d) is a plan drawing of a side air bag that has been folded like an accordion.

FIG. 16(e) is a front-view drawing of a side air bag that has been folded like an accordion.

FIGS. 17(a)–(e) are drawings for the purpose of describing how a side air bag according to the sixth embodiment of the present invention inflates.

FIG. 17(a) is a drawing showing initial inflation of the torso protection section of the front side air bag.

FIG. 17(b) shows continued expansion of front side air bag.

FIG. 17(c) shows the initial deployment of the head protection section.

FIG. 17(d) shows continued deployment of the head protection section.

FIG. 17(e) shows the front side air bag completely inflated.

DETAILED DESCRIPTION OF THE PREFERRED EMBODIMENTS

Figure 1:
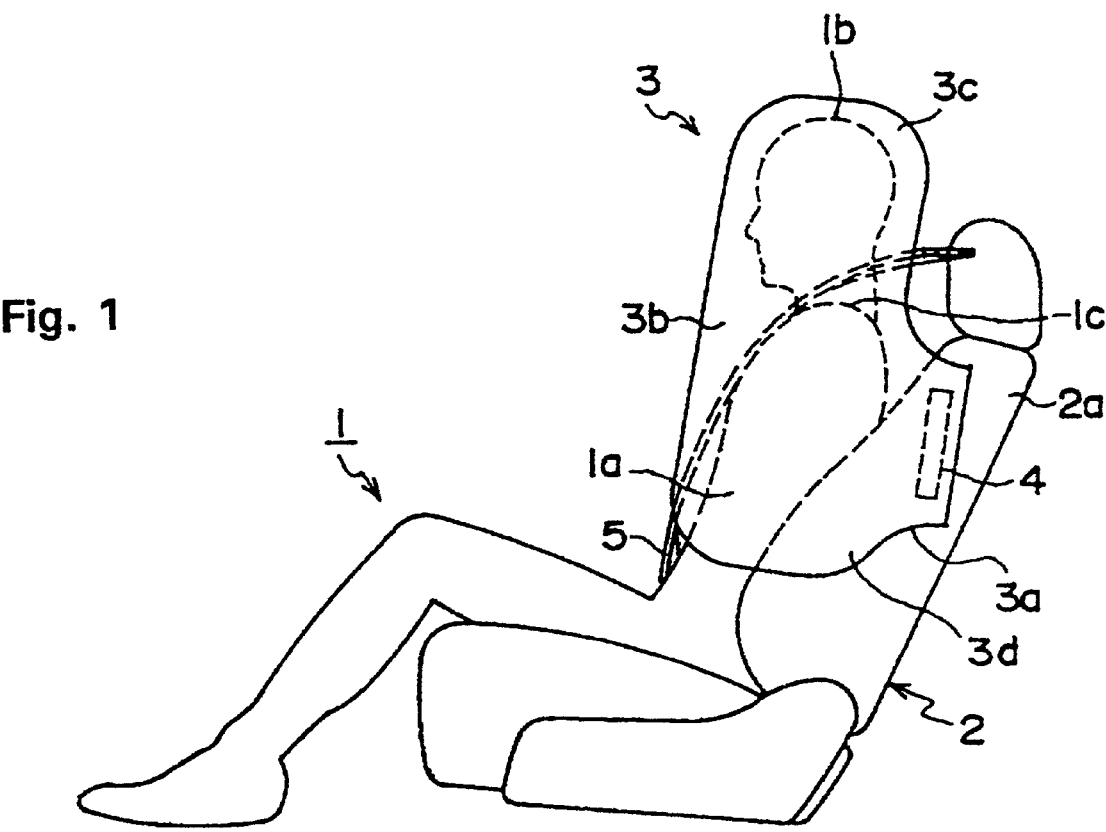
FIG. 1 is a drawing showing a side air bag according to an embodiment of the present invention for the purpose of describing the usage of the side air bag.

Referring to FIG. 1, there is shown a passenger 1 in a front seat 2 of a vehicle. A front side air bag 3 is included in the side of front seat 2. Front side air bag 3 is shown in its inflated condition. Front side air bag 3 integrally includes a supply section 3a which holds an inflator 4 that injects a pressurized fluid into front side air bag 3. A torso protection section 3b of front side air bag 3, is contiguous with supply section 3a. Torso protection section extends forward from supply section 3a toward the front of the vehicle. A head protection section 3c, is contiguous with torso protection section 3b. Head protection section 3c extends upward from torso protection section 3b toward the upper portion of the vehicle. An auxiliary section 3d is contiguous with torso protection section 3b. Auxiliary section 3d extends downward from torso protection section 3b to the lower portion of the vehicle. An opening 3e produced by the un-sewn section of supply section 3a allows space for inflator 4 to be housed into supply section 3a. Before use, front side air bag 3 is stored in an air bag device (not shown in the drawings) disposed at a seat back 2a of a front seat 2.

Figure 2:
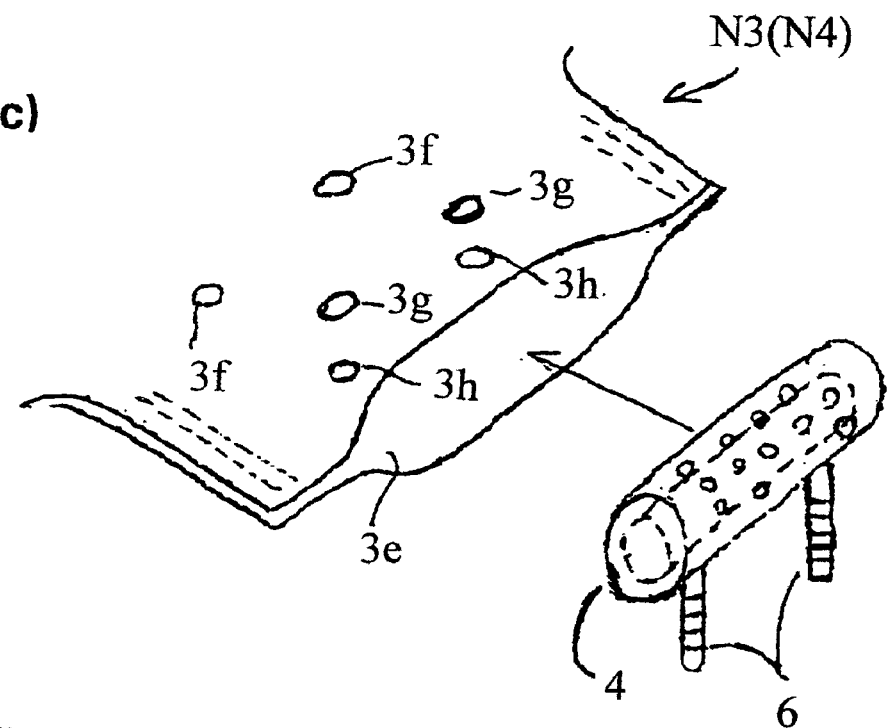
FIG. 2(a) is a front-view drawing of the side air bag according to a first embodiment of the present invention, shown before turning inside-out.
FIG. 2(b) is a cross-section drawing along the A—A line in FIG. 2(a).
FIG. 2(c)–2(e) show the assembly of the inflator and the air bag.
Figure 2:
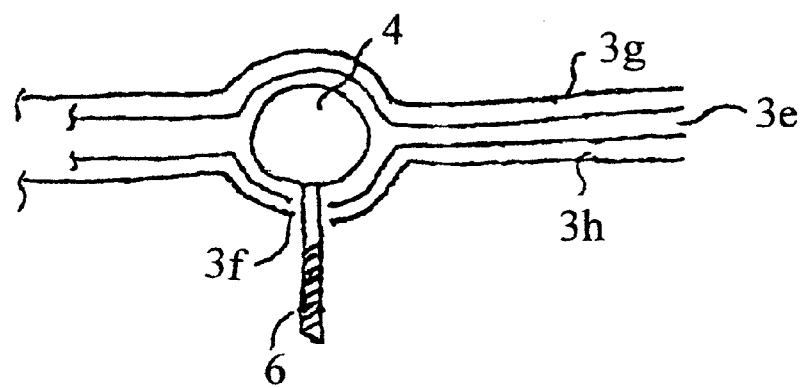
Figure 2:
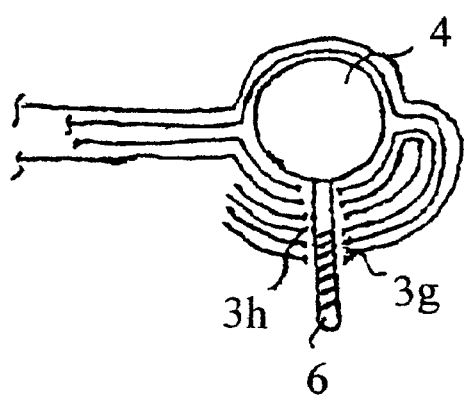

Referring to FIGS. 2(a) and 2(b), front side air bag 3 is formed by joining the edges of front and back cloth bodies N1, N2. Front and back cloth bodies N1, N2 are shaped roughly as distorted sideways "T"s. Front and back cloth bodies N1, N2 are bonded via double stitch P1, P2 at their edges, excluding one section, to form a bag. The bag is then turned inside-out so that the edges extending beyond stitches P1, P2 are disposed within front side air bag 3.

Referring now also to FIGS. 2(c)–2(e), reinforcement cloth bodies N3, N4 are placed on supply section 3a. Holes 3f, 3f are formed on cloth bodies N1, N3 to allow the insertion of attachment projections 6 disposed on inflator 4 (alternatively, a diffuser may be installed inside inflator 4). Holes 3g, 3g, 3h, 3h are formed through cloth bodies N1, N2, N3, N4. Once inflator 4 is inserted into front side air bag 3, attachment projections 6 are passed through insertion openings 3f, 3f from the inside to the outside of front side air bag 3. Attachment projections 6 are then further passed through openings 3g, 3g, 3h, 3h by folding back the cloth from opening 3e, thus sealing opening 3e. The edges of openings 3f, 3g, 3h may be sewn (not shown in the drawings) for reinforcement with cloth bodies N1, N3 and cloth bodies N2, N4 facing each other.

Figure 3:
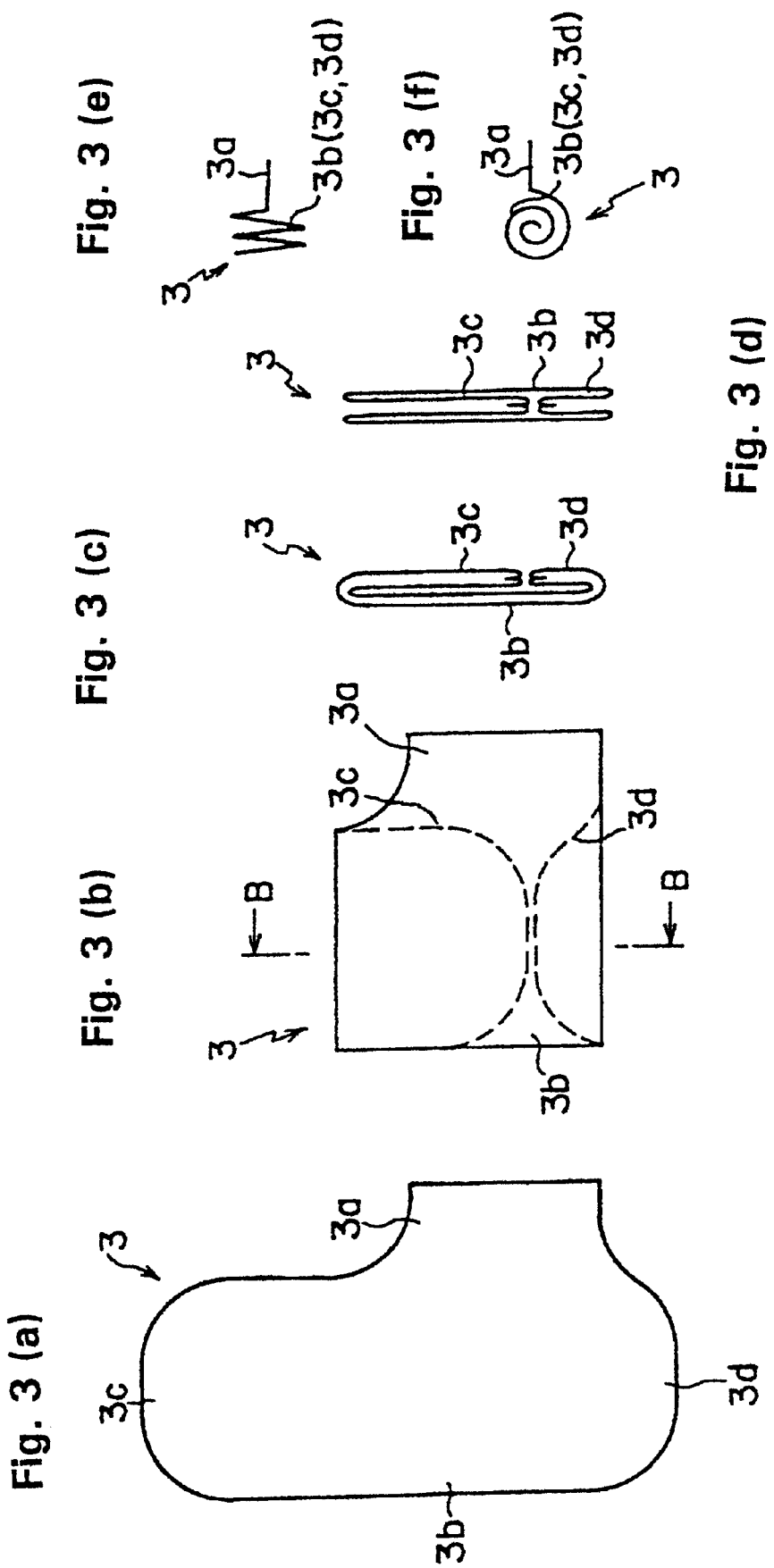
FIG. 3(a) is a front-view drawing of a side air bag of the first embodiment of the present invention.
FIG. 3(b) is a front-view drawing of a front side air bag in a folded or stored state.
FIG. 3(c) is a cross-section drawing along the B—B line in FIG. 3(b).
FIG. 3(d) is a cross-section drawing along the B—B line in FIG. 3(b) showing the side air bag in a stored state.
FIG. 3(e) is a plan drawing of a side air bag that has been folded like an accordion.
FIG. 3(f) is a front-view drawing of a side air bag that has been rolled up.
Figure 5:
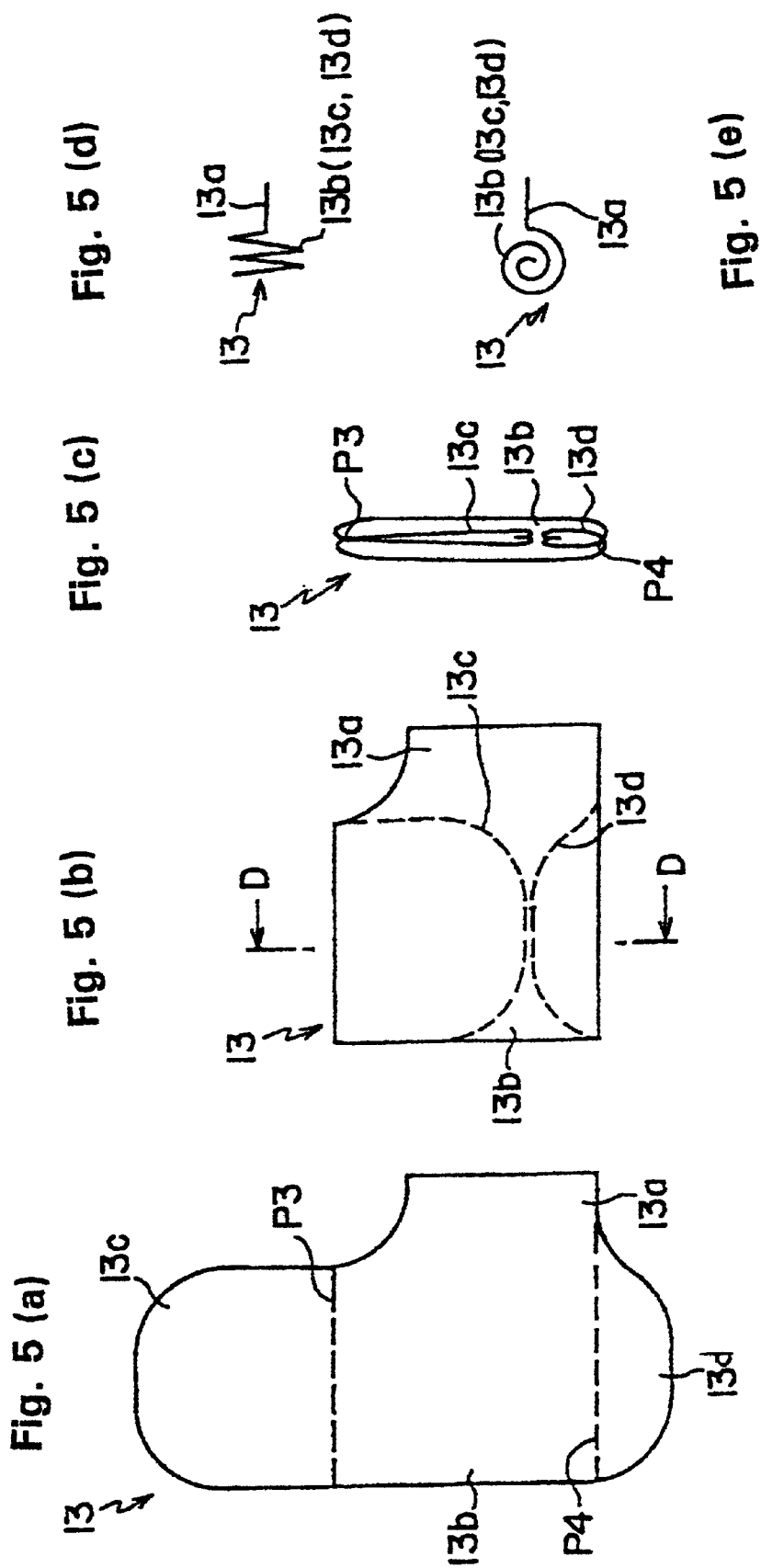
FIG. 5(a) is a front-view drawing of the side air bag of the second embodiment of the present invention.
FIG. 5(b) is a front-view drawing of a front-side air bag in the stored state.
FIG. 5(c) is a cross-section drawing along the D—D line in FIG. 5(b) showing the side air bag in a stored state.
FIG. 5(d) is a plan drawing of a side air bag that has been folded like an accordion.
FIG. 5(e) is a front-view drawing of a side air bag that has been rolled up.

FIGS. 3(a)–3(f) show how front side air bag 3 is stored within the air bag device. Referring to FIG. 3(b) and FIG.

3(c), head protection section 3c and auxiliary section 3d are folded back toward torso protection section 3b. Alternatively, head protection section 3c and auxiliary section 3d are disposed within torso protection section 3b when front side air bag 3 is turned inside-out, as shown in FIG. 3(d). Then, front side air bag 3 is folded for compact storage like an accordion as shown in FIG. 3(e), or rolled as shown in FIG. 3(f). Inflator 4 is stored in front side air bag 3 with the folded or rolled up section of torso protection section 3b and head protection section 3c and auxiliary section 3d all roughly perpendicular to supply section 3a. If front side air bag 3 is in a rolled state, it is rolled in the opposite direction from the front side door so that the unrolling that takes place during inflation causes it to roll along the inner wall surface of the front side door without sliding.

In the structure described above, front side air bag 3 stored in the air bag device is inflated by the pressurized fluid injected when inflator 4 is activated. Front side air bag 3 expands from the air bag device so that its folded or rolled state is undone. Torso protection section 3b is inflated (to the state shown in FIG. 3(a)) and a portion of torso 1a (FIG. 1) of passenger 1 is protected.

When front side air bag 3 expands, the "L" shape formed by supply section 3a, torso protection section 3b, and head protection section 3c, as well as the sequence in which these are inflated, causes head protection section 3c to try to pivot around supply section 3a toward the rear of the vehicle body due to the inflation pressure on head protection section 3c. However, this rotation is at least partly canceled out by the roughly simultaneous expansion of auxiliary section 3d, which is positioned opposite from head protection section 3c across supply section 3a. This allows front side air bag 3 to inflate efficiently without slipping against passenger 1.

The "T" shape of front side air bag 3 allows it to inflate without sliding against shoulder seat belt 5, which extends from the upper portion of a center pillar of the vehicle body across a shoulder 1c of passenger 1 to a buckle (not shown in the drawings) at a lower position toward the center of the vehicle body. This allows reliable inflation of front side air bag 3.

The timing difference between the protection of torso 1a and head 1b (complete protection takes place roughly simultaneously) provides efficient inflation with a compact inflator.

Referring to FIGS. 4(a) to 5(e), there is shown a second embodiment of the side air bag of the present invention. In this second embodiment, a front side air bag 13 is disposed in an air bag device at front seat 2, as in the first embodiment described above. Referring to FIGS. 4(a) and 4(b), front side air bag 13 is formed by joining the edges of front and back cloth bodies N1, N2. Front and back cloth bodies N1, N2 shaped roughly as sideways "T"s are bonded via double stitches P1, P2 at their edges, excluding one section, an opening 13e, to form a bag. The bag is then turned inside-out so that the edges extending beyond stitches P1, P2 are disposed within front side air bag 3.

Front side air bag 13 integrally includes a supply section 13a which holds inflator 4 (FIG. 1) that injects a pressurized fluid into front side air bag 13. A torso protection section 13b of front side air bag is contiguous with supply section 13a. Torso protection section extends forward from supply section 13a toward the front of the vehicle. A head protection section 13c of front side air bag 3 is contiguous with torso protection section 13b. Head protection section extends upward from torso protection section 13b to the upper portion of the vehicle. An auxiliary section 13d, is contiguous with torso protection section 13b. Auxiliary section 13 extends downward from torso protection section 13b to the lower portion of the vehicle. Before use, front side air bag 3 is stored in an air bag device (not shown in the drawings) disposed at seat back 2a of front seat 2.

Opening 13e is formed from the un-sewn section of supply section 13a. Opening 13e allows inflator 4 (FIG. 1) to be inserted into supply section 13a. In addition to cloth bodies N1, N2, reinforcement cloth bodies N3, N4 are disposed on supply section 13a. Holes 13f, 13f through cloth bodies N1, N3 allow the insertion of attachment projections (not shown in the drawings) disposed on inflator 4 (alternatively, a diffuser—not shown in the drawings—may be installed inside inflator 4). Holes 13g, 13g, 13h, 13h are formed in cloth bodies N1, N2, N3, N4. Once inflator 4 is inserted, the attachment projections that are passed through insertion openings 13f, 13f are passed through openings 13g, 13g, 13h, 13h by folding back the cloth from opening 13e, thus sealing opening 13e. The edges of openings 13f, 13g, 13h can be sewn (not shown in the drawings) for reinforcement with cloth bodies N1, N3 and cloth bodies N2, N4 facing each other. This is the same process as for front side air bag 3 and shown in FIGS. 2(a)–2(e).

Fuse stitches P3, P4 are disposed at the boundary between torso protection section 13b and head protection section 13c, and at the boundary between torso protection section 13b and auxiliary section 13d. Fuse stitches P3, P4 are formed across cloth bodies N1 and N2 using a thread weaker than that used in stitches P1, P2. Fuse stitches P3, P4 are roughly parallel to each other and extend over roughly the entire width along the horizontal direction of the vehicle body. Fuse stitches P3, P4 are intentionally weak so that they burst at a proper time during deployment. FIGS. 5(a)–5(f) show an example of how front side air bag 13 is stored in an air bag device.

Referring to FIG. 5(b) and FIG. 5(c), front side air bag 13 is turned inside-out so that the edges are disposed inside the bag and so that head protection section 13c and auxiliary section 13d are stored inside torso protection section 13b. Front side air bag 13 is then folded like an accordion as shown in FIG. 5(d) or is rolled up as shown in FIG. 5(e). The folded or rolled up section of torso protection section 13b and head protection section 13c and auxiliary section 13d are all oriented roughly perpendicularly to supply section 13a. As in the first embodiment, inflator 4 is stored in supply section 13a and front side air bag 13 is placed in the air bag device.

With this arrangement, front side air bag 13, stored in the air bag device, is inflated by the pressurized fluid injected when inflator 4 is activated. Front side air bag 13 is inflated from the air bag device so that its folded or rolled state is undone. Torso protection section 13b inflates first (to the state shown in FIG. 5(b)) and a portion of torso 1a (FIG. 1) of passenger 1 is protected.

As the injection of pressurized fluid from inflator 4 continues, the pressure causes fuse stitches P3, P4 to break thereby permitting head protection section 13c and auxiliary section 13d, which were in a stored state, to inflate and extend roughly simultaneously (to the state shown in FIG. 5(a)). Thus, head 1b (FIG. 1) and torso 1a of passenger 1 are protected. The inflation sequence enforced by fuse stitches P3, P4, besides providing a time delay for inflation of head protection section 13c and auxiliary section 13d, also ensures initial inflation without distortion.

Without fuse stitches P3, P4, when front side air bag 13 expands, the "L" shape formed by supply section 13a, torso protection section 13b, and head protection section 13c, as well as the sequence in which these are inflated, would cause head protection section 13c to try to pivot around supply section 13a toward the rear of the vehicle body due to the inflation pressure on head protection section 13c. However, this rotation is prevented initially by fuse stitches P3, P4 until torso protection section 13b is substantially fully inflated. Then when fuse stitches P3, P4 are broken, pivoting is prevented by the rigidity of the inflated supply section 13a and torso protection portion 13b and, in addition, is at least partly canceled out by the roughly simultaneous expansion of auxiliary section 13d, which is positioned opposite from head protection section 13c across supply section 13a. This allows front side air bag 13 to inflate efficiently without slipping against passenger 1.

The "T" shape of front side air bag 13 allows it to inflate without sliding against shoulder seat belt 5, which extends from the upper portion of a center pillar of the vehicle body across shoulder 1c of passenger 1 to a buckle (not shown in the drawings) at a lower position toward the center of the vehicle body. This allows reliable inflation of front side air bag 13.

By providing a temporal difference between the protection of torso 1a and head 1b (complete protection takes place roughly simultaneously), efficient inflation is provided and a compact inflator can be used. Fuse stitches P3, P4 may have the same strength, thereby busting simultaneously, or they may have different strengths, thereby providing stepped temporal differences in inflation.

FIGS. 6(a) to 7(e) show a third embodiment of the side air bag of the present invention. A front side air bag 23 according to the third embodiment is disposed in the air bag device of front seat 2 as in the first embodiment. Referring to FIGS. 6(a) and 6(b), front side air bag 23 is formed by joining the edges of a front cloth body N1 and a back cloth body N2. Front and back cloth bodies N1, N2 are bonded at their edges, excluding one section, by double stitches P1, P2, thereby forming a bag. Front and back cloth bodies N1, N2 are shaped in the form of sideways "T"s. Front side air bag 23 integrally includes a supply section 23a in which is stored an inflator 4 (FIG. 1) which injects pressurized fluid into front side air bag 23. A torso protection section 23b is contiguous with supply section 23a. Torso protection section 23b extends forward from supply section 23a toward the front of the vehicle. A head protection section 23c is contiguous with torso protection section 23b. Head protection section 23c extends upward from torso protection section 23b toward the front of the vehicle. An auxiliary section 23d is contiguous with torso protection section 23b. Auxiliary section 23d extends from torso protection section 23b to the bottom of the vehicle body. Front side air bag 23 is generally stored in an air bag device (not shown in the drawings) disposed on seat back 2a of front seat 2.

The section of supply section 23a left unstitched forms an opening 23e that allows the insertion of inflator 4 into supply section 23a. Cloth bodies N3, N4 are disposed on supply section 23a for reinforcement. Holes 23f, 23f in cloth bodies N1, N3 allow the insertion of attachment projections (not shown in the drawings) disposed on inflator 4 (alternatively, a diffuser—not shown in the drawings—may be installed inside inflator 4). Holes 23g, 23g, 23h, 23h are formed on cloth bodies N1, N2, N3, N4. Once inflator 4 is inserted, the attachment projections that are passed through insertion openings 23f, 23f can be passed through openings 23g, 23g, 23h, 23h by folding back the cloth from opening 23e, thus sealing opening 23e. The edges of openings 23f, 23g, 23h can be sewn (not shown in the drawings) for reinforcement with cloth bodies N1, N3 and cloth bodies N2, N4 facing each other. This is the same process as for front side air bag 3 and shown in FIGS. 2(a)–2(e).

Fuse stitches P5, P6 are disposed at a boundary between torso protection section 23b and head protection section 23c, and at a boundary between torso protection section 23b and auxiliary section 23d. Fuse stitches P5, P6 are formed across cloth bodies N1 and N2 using a thread weaker than that used in stitches P1, P2. Fuse stitches P5, P6 are roughly parallel to each other and extend over roughly the entire width of the device in an upward diagonal orientation toward the front of the vehicle body.

FIGS. 7(a)–7(f) show examples of how front side air bag 23 as described above can be stored in the air bag device. Referring to FIG. 7(b) and FIG. 7(c), front side air bag 23 is turned inside-out so that the edges are disposed in the bag. Head protection section 23c and auxiliary section 23d are thus stored inside torso protection section 23b. Front side air bag 23 is folded like an accordion as shown in FIG. 7(d) or rolled up as shown in FIG. 7(e). The folded or rolled up portion of torso protection section 23b and head protection section 23c and auxiliary section 23d are all roughly perpendicular to supply section 23a. As in the first embodiment, inflator 4 (FIG. 1) is stored in supply section 23a and front side air bag 23 is stored in the air bag device.

In the structure described above, front side air bag 23 stored in the air bag device is inflated by the pressurized fluid injected when inflator 4 (FIG. 1) is activated. Front side air bag 23 expands from the air bag device so that its folded or rolled state is undone. Torso protection section 23b is inflated (to the state shown in FIG. 7(b)) and a portion of torso 1a of passenger 1 is protected.

As the injection of pressurized fluid from inflator 4 continues, the pressure breaks fuse stitches P5, P6 inflating head protection section 23c and auxiliary section 23d, which were in a stored state, and extending them roughly simultaneously (to the state shown in FIG. 7(a)). Thus, head 1b (FIG. 1) and torso 1a of passenger 1 are protected in a timed sequence.

When front side air bag 23 expands, the "L" shape formed by supply section 23a, torso protection section 23b, and head protection section 23c, as well as the sequence in which these are inflated, causes head protection section 23c to try to pivot around supply section 23a toward the rear of the vehicle body due to the inflation pressure on head protection section 23c. However, this rotation is prevented initially by fuse stitches P5 and P6 until front side air bag 23 is substantially fully inflated. Then when fuse stitches P5 and P6 are broken, pivoting is canceled out by the roughly simultaneous expansion of auxiliary section 23d, which is positioned opposite head protection section 23c across supply section 23a. This allows front side air bag 3 to inflate efficiently without slipping against passenger 1. The "T" shape of front side air bag 23 allows it to inflate without sliding against shoulder seat belt 5, which extends from the upper portion of a center pillar of the vehicle body across shoulder 1c of passenger 1 to a buckle (not shown in the drawings) at a lower position toward the center of the vehicle body, thus allowing reliable inflation of front side air bag 23.

The diagonal orientation of fuse stitches P5, P6 reduces the difference in volume between head protection section 23c, above fuse stitch PS, and auxiliary section 23d, below fuse stitch P6, compared to that of the second embodiment, where the stitches are not diagonal. This further diminishes slippage during inflation.

The temporal difference between the protection of torso 1a and head 1b (complete protection takes place roughly simultaneously), provides efficient inflation where a compact inflator can be used.

Referring now to FIGS. 8(a)–10(d), there is shown a fourth embodiment of the side air bag of the present invention. In this fourth embodiment, front side air bag 33 is disposed in the air bag device at front seat 2 as in the first embodiment.

Referring to FIGS. 8(a) and 8(b), front side air bag 33 is formed by joining the edges of front and back cloth bodies N1, N2, as in previous embodiments. Front and back cloth bodies N1, N2 are shaped roughly as sideways "T"s and are bonded via double stitch P1, P2, except for one section, to form a bag. Front side air bag 33 integrally includes a supply section 33a which holds inflator 4 (FIG. 1) that injects a pressurized fluid into front side air bag 3. A torso protection section 33b of front side air bag 33 is contiguous with supply section 33a. Torso protection section 33b extends forward from supply section 33a to the front of the vehicle A head protection section 33c is contiguous with torso protection section 33b. Head protection section 33v extends upward from torso protection section 33b to the upper portion of the vehicle. An auxiliary section 33d is contiguous with torso protection section 33b and extends downward from torso protection section 33b to the lower portion of the vehicle body. Before use, front side air bag 33 is stored in an air bag device (not shown in the drawings) disposed at seat back 2a of front seat 2 (FIG. 1).

An opening 33e is formed by the un-sewn section of supply section 33a. Opening 33e allows inflator 4 (FIG. 1) to be inserted into supply section 33a. Reinforcement cloth bodies N3, N4 are disposed on supply section 33a. Holes 33f, 33f in cloth bodies N1, N3 allow the insertion of attachment projections (not shown in the drawings) on inflator 4 (alternatively, a diffuser not shown in the drawings—installed inside inflator 4). Holes 33g, 33g, 33h, 33h are formed in cloth bodies N1, N2, N3, N4. Once inflator 4 is inserted, the attachment projections that are passed through insertion openings 33f, 33f are passed through openings 33g, 33g, 33h, 33h by folding back the cloth from opening 33e, thus sealing opening 33e. The edges of openings 33f, 33g, 33h can be sewn (not shown in the drawings) for reinforcement with cloth bodies N1, N3 and cloth bodies N2, N4 facing each other. This is the same process as for front side air bag 3 and shown in FIGS. 2(a)–2(e).

Fuse stitches P7 (horizontal), P8 (diagonal with a positive slope), and P9 (diagonal with a negative slope) are disposed at a boundary between torso protection section 33b and auxiliary section 33d, at a boundary between torso protection section 33b and head protection section 33c, and near a boundary between torso protection section 23b and auxiliary section 33d somewhat toward auxiliary section 33d, respectively. Unlike fuse stitches P5 and P6 in FIG. 6(a) and P3 and P4 in FIG. 4(a), fuse stitches P7–P9 do not traverse an entire cross-section of front side air bag 33. Fuse stitch P7 is positioned at approximately the center region of the border between torso protection section 33b and auxiliary section 33d and is oriented roughly horizontally to the vehicle body. Fuse stitch P8 extends from the border between torso protection section 33b and head protection section 33c to a roughly central section that spans the two. Fuse stitch P8 is oriented diagonally upward and to the rear. Fuse stitch P9 is positioned slightly downward from fuse stitch P7 toward supply section 33a and is oriented diagonally downward and to the rear. Thus, unlike the second and third embodiments described above, fuse stitches P7, P8, and P9 span part way across torso protection section 33b and head protection section 33c, as well as torso protection section 33b and auxiliary section 33d, which are partially contiguous. This allows fuse stitches P7, P8, and P9 to be reliably broken by outward force as front side air bag 33 expands.

FIGS. 9(a)–9(f) show examples of how front side air bag 33 can be stored in the air bag device. Referring to FIG. 9(b) and 9(c), front side air bag 33 is turned inside-out so that the edges are disposed inside the bag. Head protection section 33c and auxiliary section 33d are disposed in torso protection section. Then, front side air bag 33 is folded like an accordion, as shown in FIG. 9(d), or is rolled up, as shown in FIG. 9(e). The folded or rolled-up section of torso protection section 33b and head protection section 33c and auxiliary section 33d are all oriented roughly perpendicularly to supply section 33a. As in the first embodiment, inflator 4 (FIG. 1) is stored in supply section 33a and front side air bag 33 is stored in the air bag device.

When inflator 4 is activated, the injection of pressurized fluid causes front side air bag 33, which is stored in the air bag device, to expand from the air bag device. Referring to FIG. 10(a), the folded or rolled-up state is undone and torso protection section 33b inflates so that a portion of torso 1a (FIG. 1) of passenger 1 is protected.

Referring to FIG. 10(b), as inflator 4 continues to inject pressurized fluid, the pressurized fluid is sent to head protection section 33c and auxiliary section 33d via the contiguous sections, which are interposed by fuse stitches P7, P8. As a result, initial inflation of head protection section 33c and auxiliary section 33d takes place. At this time, head protection section 33c and auxiliary section 33d are held in the folded position by the presence of fuse stitches P7, P8. Referring to FIG. 10(c), the further increase in pressure breaks fuse stitches P7, P8, and head protection section 33c and auxiliary section 33d thereby releasing these elements to unfold, and thus begin overall expansion and extension. Finally, in that expansion and extension, fuse stitch P9 is broken. Referring to FIG. 10(d), head protection section 33c and auxiliary section 33d extend roughly simultaneously. Thus, head 1b (FIG. 1) and torso 1a are protected.

The "L" shape formed by supply section 33a, torso protection section 33b, and head protection section 33c, as well as the sequence in which these are inflated, would cause head protection section 33c to try to pivot around supply section 33a toward the rear of the vehicle body due to the inflation pressure on head protection section 33c. However, this rotation is initially prevented by fuse stitches P7–P9, which hold head protection section 33c and auxiliary section 33d in the folded condition. When torso protection section 33b of front side air bag is substantially fully inflated, such rotation is canceled out by the roughly simultaneous expansion of auxiliary section 33d, which is positioned opposite from head protection section 33c across supply section 33a. This allows front side air bag 33 to inflate efficiently without slipping against passenger 1. The "T" shape of front side air bag 33 allows it to inflate without sliding against shoulder seat belt 5, which extends from the upper portion of a center pillar of the vehicle body across shoulder 1c of passenger 1 to the buckle (not shown in the drawings) at a lower position toward the center of the vehicle body, thus allowing reliable inflation of front side air bag 33.

The temporal difference between the protection of torso 1a (FIG. 1) and head 1b (complete protection takes place roughly simultaneously), provides efficient inflation with a compact inflator.

Figure 11:
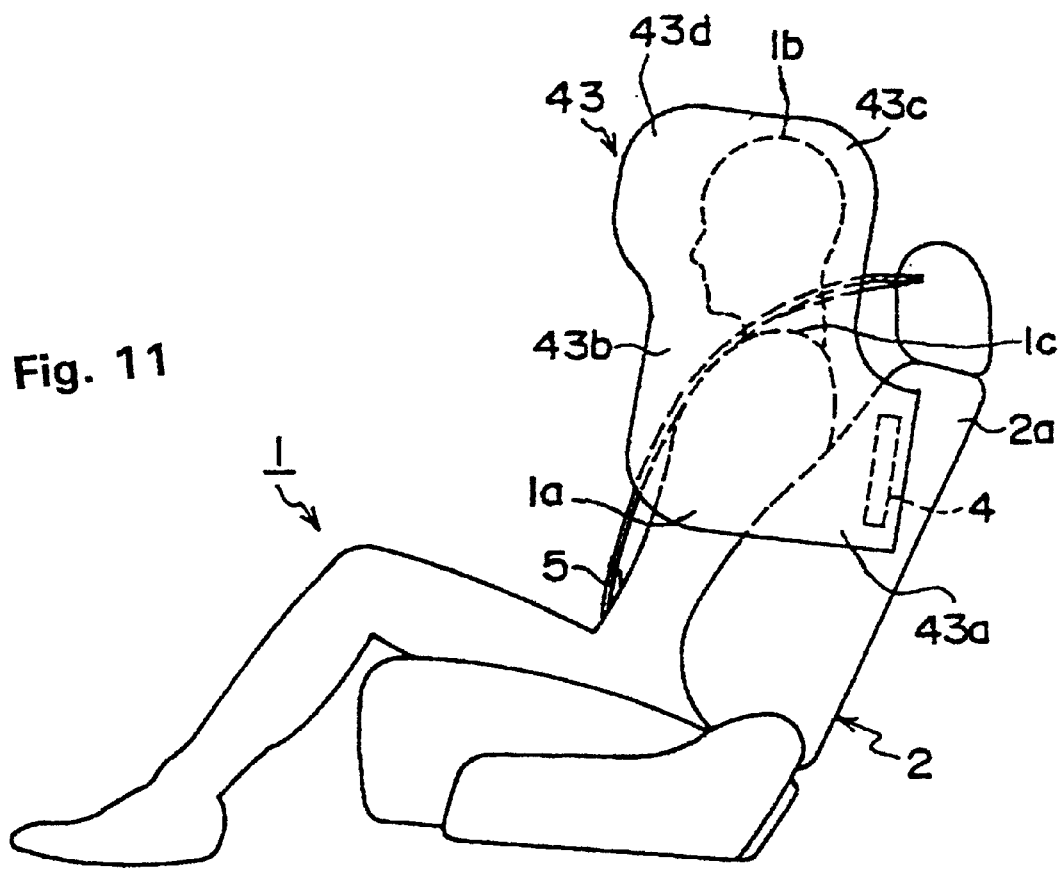
FIG. 11 is a side view showing a side air bag according to the fifth embodiment of the present invention.

FIGS. 11 through 13(e) show a fifth embodiment of the side air bag according to the present invention. Referring to FIG. 11, a front side air bag 43 according to the fifth embodiment is disposed in an air bag device at front seat 2 as in the first embodiment.

Figures 12A, 12B:
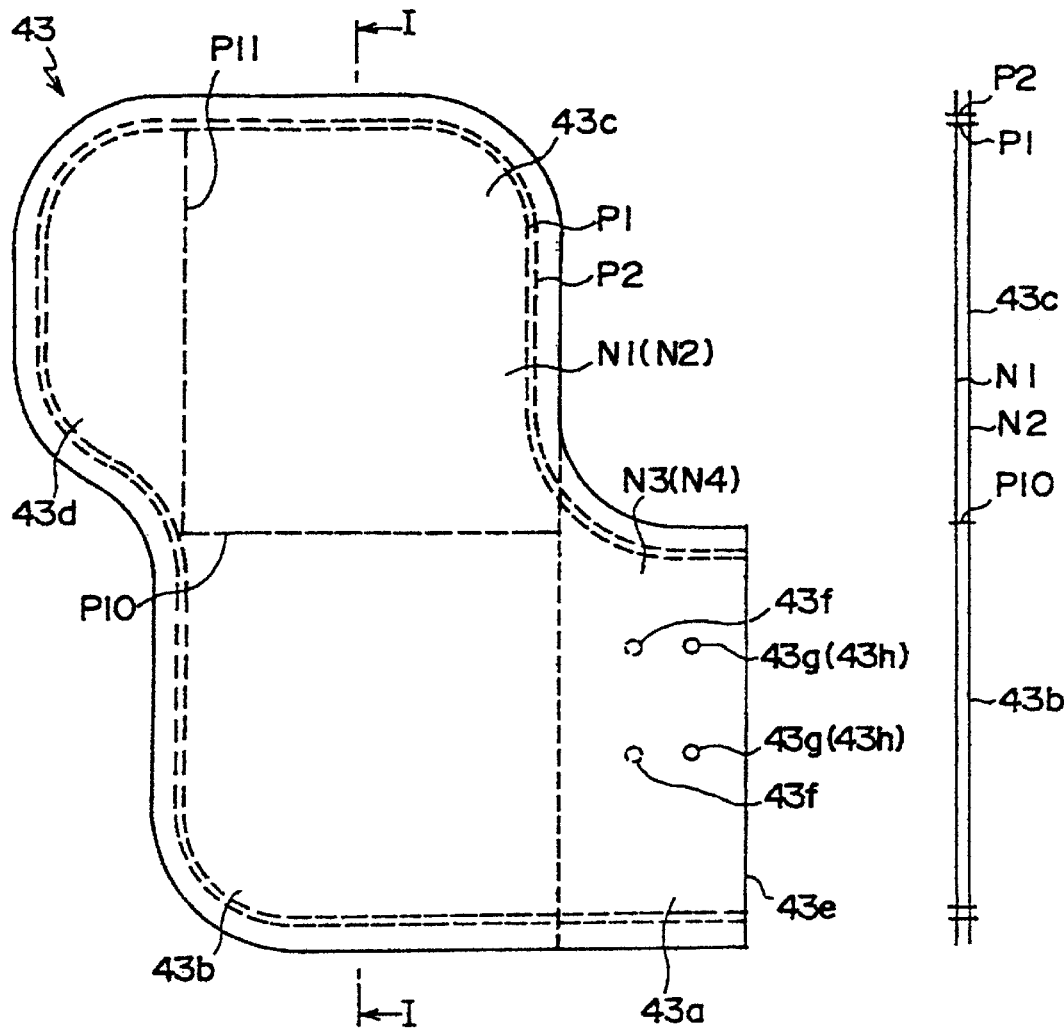
FIG. 12(a) is a front-view drawing of the side air bag according to a fifth embodiment of the present invention.
FIG. 12(b) is a cross-section drawing along the I—I line in FIG. 11(a).
Figure 14:
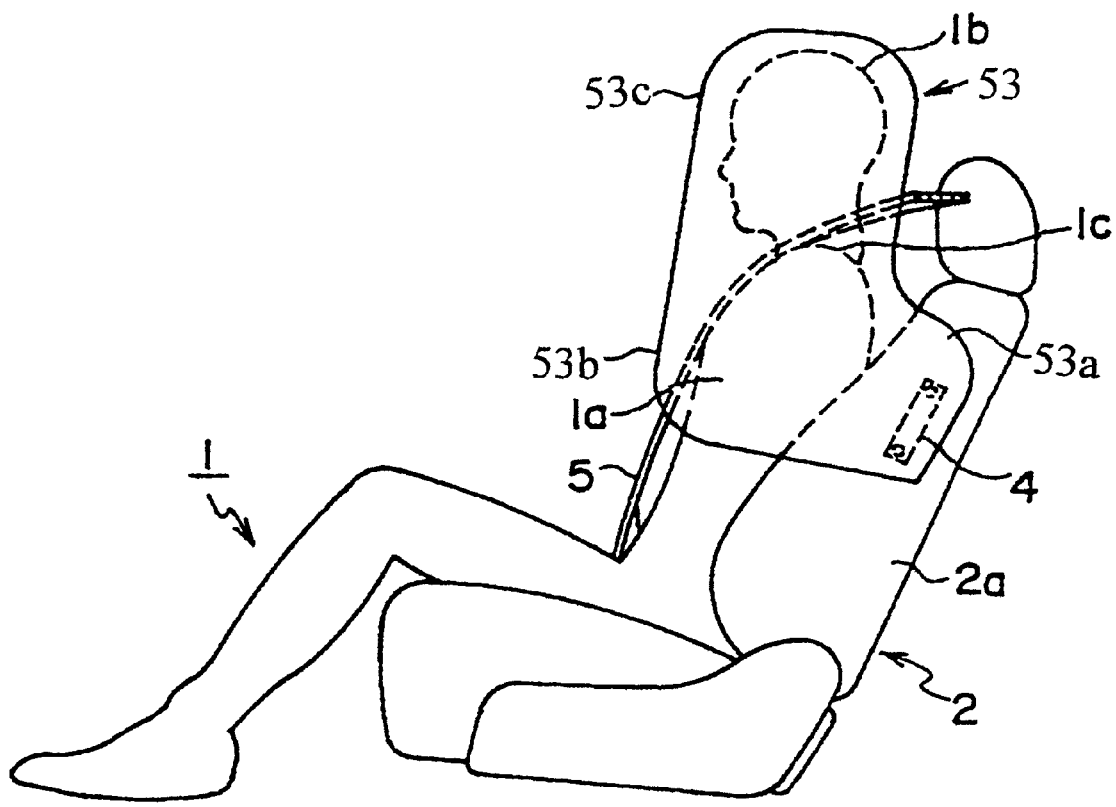
FIG. 14 is a side view of a side air bag according to a sixth embodiment of the present invention showing how the front side air bag protects the torso and head.

Referring to FIG. 12(a) and 12(b), front side air bag 43 is formed by joining the edges of front and back of crank-shaped cloth bodies N1, N2 via double stitch P1, P2 except at one section. Front side air bag 43 integrally includes a supply section 43a which holds inflator 4 (FIG. 1) that injects a pressurized fluid into front side air bag 43. A torso protection section 43b of front side air bag 43 is contiguous with supply section 43a. Torso protection section extends forward from supply section 43a to the front of the vehicle. A head protection section 43c is contiguous with torso protection section 43b. Head protection section extends upward from torso protection section 43b toward the upper portion of the vehicle. An auxiliary section 43d, contiguous with head protection section 43c, extends forward from head protection section 43c. Before use, front side air bag 43 is stored in an air bag device (not shown in the drawings) disposed at seat back 2a of front seat 2.

Opening 43e is formed from the un-sewn section of supply section 43a. Opening 43e allows inflator 4 to be inserted into supply section 43a. Reinforcement cloth bodies N3, N4 are disposed on supply section 43a. Holes 43f, 43f in cloth bodies N1, N3 fit over attachment projections (not shown in the drawings) disposed on inflator 4 (alternatively, a diffuser—not shown in the drawings—may be installed inside inflator 4). Holes 43g, 43g, 43h, 43h are formed in cloth bodies N1, N2, N3, N4. Once inflator 4 is inserted, the attachment projections that are passed through insertion openings 43f, 43f can be passed through openings 43g, 43g, 43h, 43h by folding back the cloth from opening 43e, thus sealing opening 43e. The edges of openings 43f, 43g, 43h can be sewn (not shown in the drawings) for reinforcement with cloth bodies N1, N3 and cloth bodies N2, N4 facing each other. This is the same process as for front side air bag 3 and shown in FIGS. 2(a)–2(e).

Fuse stitches P10, P11 are disposed at a boundary between torso protection section 43b and head protection section 43c, and at a boundary between torso protection section 43b and auxiliary section 43d, respectively. Fuse stitch P10 is positioned at the border between torso protection section 43b and head protection section 43c, and is oriented roughly horizontal relative to the vehicle body, spanning roughly the entire length. Fuse stitch P11 is positioned at the border between head protection section 43c and auxiliary section 43d, and is oriented roughly vertical relative to the vehicle body, spanning roughly the entire length.

FIGS. 13(a)–13(f), show examples of how front side air bag 43 is stored in the air bag device. Referring to FIG. 13(b) and FIG. 13(c), auxiliary section 43d is folded back toward head protection section 43c, and front side air bag 43 is turned inside-out so that head protection section 43c and auxiliary section 43d are stored in torso protection section 43b. Front side air bag 43 is then folded like an accordion, as shown in FIG. 13(d), or rolled up, as shown in FIG. 13(e). The folded or rolled-up section of torso protection section 43b and head protection section 43c and auxiliary section 43d are all disposed roughly perpendicularly to supply section 43a. Inflator 4 is stored in supply section 43a and front side air bag 43 is stored in the air bag device, as in the first embodiment.

In the structure described above, front side air bag 43 stored in the air bag device is inflated by the pressurized fluid injected when inflator 4 is activated. Front side air bag 43 expands from the air bag device so that its folded or rolled state is undone. Torso protection section 43b is inflated (to the state shown in FIG. 13(b)) and a portion of torso 1a (FIG. 1) of passenger 1 is protected.

As the injection of pressurized fluid from inflator 4 continues, the pressure first causes fuse stitch P10 to break. The pressurized fluid flows into head protection section 43c, then causing head protection section 43c to extend. This initial expansion also causes fuse stitch P11 to break, after a slight delay, which results in the inflation auxiliary section 43d. Thus, head 1b and torso 1a of passenger 1 are protected.

The crank shape of front side air bag 43 allows it to inflate without sliding against shoulder seat belt 5, which extends from the upper portion of a center pillar of the vehicle body across shoulder 1c of passenger 1 to a buckle (not shown in the drawings) at a lower position toward the center of the vehicle body, thus allowing reliable inflation of front side air bag 43.

Referring now to FIGS. 14 to 17(e), there is shown a sixth embodiment of the present invention. In FIG. 14, there is shown again a passenger 1 sitting in a front seat 2 of a vehicle. Front side air bag 53 is included on the side of front seat 2. Front side air bag 53 is shown in its inflated condition. Front side air bag 53 is formed from a front and back cloth body bonded together at their edges via double-sewing to form a roughly L-shaped body. A portion of the bag is not sewn thereby forming an opening 53e through which an inflator 4 is inserted. L-shaped front side air bag 53 includes a supply section 53a holding inflator 4 (or, alternatively, a diffuser—not shown in the drawings—may be installed in inflator 4) which injects a pressurized fluid into front side air bag 53. A torso protection section 53b of front side air bag 53 extends from supply section 53a toward the front of the vehicle and is contiguous with supply section 53a. A head protection section 53c extends from torso protection section 53b toward the upper portion of the vehicle body and is contiguous with torso protection section 53b. Before use, front side air bag 53 is stored in the air bag device (not shown in the drawings) disposed at a seat back 2a of front seat 2.

Figure 15C:
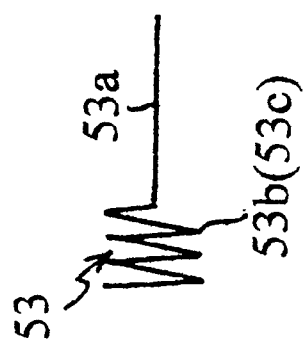
FIG. 15(c) is a plan drawing of a side air bag that has been folded like an accordion.
Figure 15D:
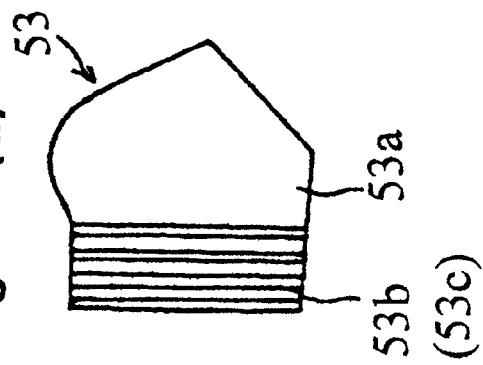
FIG. 15(d) is a front-view drawing of a side air bag that has been folded like an accordion.
Figure 15B:
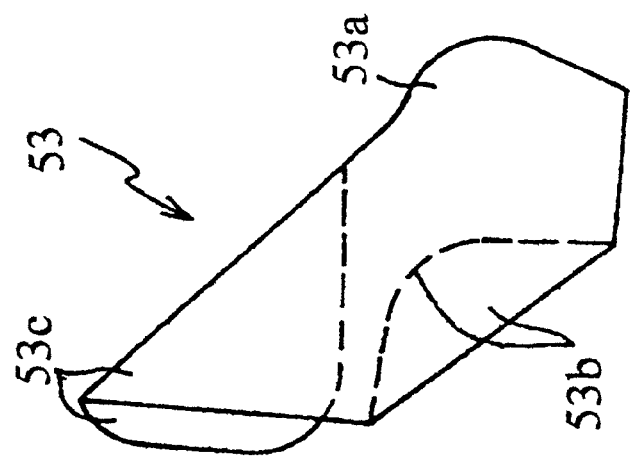
FIG. 15(b) is a front-view drawing of a side air bag in the folded state.
Figure 15A:
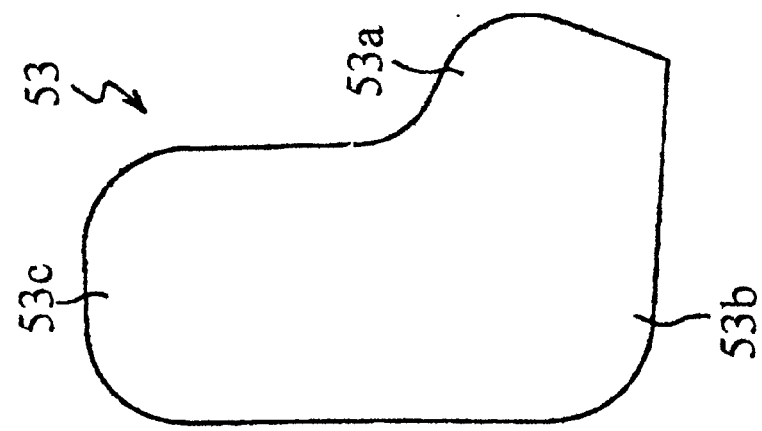
FIG. 15(a) is a front-view drawing of a side air bag according to the sixth embodiment.

FIGS. 15(a)–15(d) show a first example of how front side air bag 53 is stored in the air bag device. The bag is turned inside-out so that the edges are disposed inside of the bag. Referring to FIG. 15(b), the corner of head protection section 53c toward the rear of the vehicle body is folded over to the other side (away from the viewer in FIG. 14(b)), and the corner of torso protection section 53b toward the front of the vehicle body is also folded over to the other side. The folded portions encompass substantially the same surface area. When the corners of head protection section 53c and torso protection section 53b are folded over, the horizontal portions of the fold lines are roughly parallel.

Referring to FIGS. 15(c) and 15(d), front side air bag 53 is then folded like an accordion (alternatively, front side air bag 53 can be rolled up), and is placed in the air bag device after inflator 4 is stored in supply section 53a. If front side air bag 53 is to be rolled up, it must be rolled in the direction opposite to the front side door. Thus, when front side air bag 53 unfurls during inflation, it will roll along the inner wall surface of the front side door without sliding.

Folding side air bag 53 in this way produces similar benefits as in embodiments 2 and 3 but without the need for fuse stitches P3–P6. When air bag 53 is actuated, the unfolded portion of torso protection section 53b begins to inflate. Torso protection section 53b continues inflating and expanding until the folded portion of torso protection section 53b and the folded portion of heard protection section 53c unfold and begin to inflate as well. By that time, torso protection section 53b is substantially rigid. In this way, a time delay is created between the inflation of head protection section 53c and torso protection section 53b. Moreover, since the folded portions cover substantially the same area, the folded portion of torso protection section 53b acts like an auxiliary section. This means that since this new auxiliary section is inflated at the same time as head protection section 53c, the auxiliary section inhibits unwanted pivoting.

Referring to FIGS. 16(a)–16(e), there is shown another example of how front side air bag 53 can be stored in the air bag device. Front side air bag 53 is formed as a bag as shown in FIG. 16(a). Referring to FIG. 16(b) and 16(c), the corner of head protection section 53c toward the rear of side air bag 53 and the corner of torso protection section 53b toward the front of side air bag 53 are pushed inside air bag 53 itself.

Referring to FIGS. 16(d) and 16(e), front side air bag 53 is then folded like an accordion (alternatively, front side air bag 53 can be rolled up), and is placed in the air bag device after inflator 4 is disposed in supply section 53a. When this is done, the corners of head protection section 53c and torso protection section 53b are folded in with the fold lines roughly diagonal and parallel to one another. Depressing the aforementioned corners and then folding or rolling the resultant combination also creates the same benefits as in embodiments 2 and 3 above. Again this is accomplished without the use of fuse stitches. When side air bag 53 is actuated, and a fluid is injected into supply section 53a, the unfolded section of side air bag 53 begins to inflate. Side air bag 53 inflates upward toward the top of the vehicle body because the diagonal folds initially restrict complete inflation. Once torso protection section 53b becomes substantially inflated, the folded portions open up, the depressed portions evacuate, and the complete air bag is inflated. This structure prevents pivoting because head protection section 53c can not inflate until torso protection section 53b is substantially inflated, due to the depression of the corners within side air bag 53. A temporal difference between the inflation of torso protection section 53b and head protection section 53c is realized and a substitute auxiliary section is formed in this way.

Referring now to FIG. 17(a), front side air bag 53 is held in the air bag device. When inflator 4 is activated, pressurized fluid is injected and front side air bag 53 inflates out from the air bag device. Referring to FIG. 17(b), the folded or rolled-up state of front side air bag 53 is undone, and a portion of torso protection section 53b inflates, thus protecting a section of a torso 1a (FIG. 14) and a head 1b of passenger 1.

Referring to FIG. 17(c), inflator 4 continues to inject pressurized fluid into front side air bag 53 and thus causes the corners of head protection section 53c and torso protection section 53b which are in a folded (or stored) state, to inflate. Referring to FIG. 17(e), there is shown front side air bag 53 completely inflated, and torso 1a and head 1b are protected.

Since front side air bag 53 is L-shaped, head protection section 53c is positioned away from supply section 53a. Thus, as head protection section 53c is inflating, the resulting inflation pressure causes head protection section 53c to try to rotate around supply section 53a. However, this rotation is substantially canceled out due to the expansion of the corner of torso protection section 53b toward the front of the vehicle body, which is opposite from supply section 53a and the direction of rotation. Thus, front side air bag 53 inflates effectively without slipping off passenger 1.

Furthermore, the "L" shape of front side air bag 53 also allows it to inflate without rubbing against a shoulder seat belt 5, which extends from the upper portion of the center pillar of the vehicle body past a shoulder 1c of passenger 1 and to a buckle (not shown in the drawings) at a lower position toward the center of the vehicle body. This allows front side air bag 53 to inflate reliably. The temporal difference between the protection of torso 1a and the protection of head 1b (complete protection takes place roughly simultaneously) provides efficient inflation and allows the inflator to be compact.

As described above, the side air bag according to the sixth embodiment of the present invention is formed in an "L" shape. The corner of the head protection section toward the rear of the vehicle body and the corner of the torso protection section toward the front of the vehicle are folded into another section of the side air bag. This prevents the side air bag from pivoting around the supply section in response to the inflation pressure that is generated when the inflator is activated and the head protection section is injected with pressurized fluid. The side air bag is stored in the air bag device in a folded or rolled state. With this type of structure, it is possible to have a side air bag that is simple and inexpensive but that provides reliable and efficient inflation and a compact inflator.

In the above embodiments, fuse stitches accompany an auxiliary section. However, it is to be understood that since the fuse stitches cause a temporal delay which also aids in preventing unwanted pivoting of a front side air bag, fuse stitches can be used alone or in conjunction with an auxiliary section.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A side air bag comprising:

a bag with a supply section;

an inflator sealed in said supply section;

a torso protection section contiguous to and extending forward from said supply section;

a head protection section contiguous to and extending upward from said torso protection section;

preventing means for preventing said head protection section from pivoting toward said supply section during inflation thereof;

said preventing means includes at least one auxiliary section for applying an anti-rotational force to said head protection section; and said preventing means includes a corner of a rear end of said head protection section folded toward a front end of said air bag, and a corner of a front end of said torso protection section folded toward a rear end of said air bag, thereby creating folded sections with horizontal portions of said folded sections being substantially parallel to one another.

2. A side air bag as in claim 1 wherein said supply section, said head protection section, and said torso protection section form an L-shape.

3. A side air bag as in claim 1 wherein said auxiliary section and said head protection section are folded toward said torso protection section.

4. A side air bag, having a front end and a rear end, comprising:
- a bag with a supply section;
- an inflator sealed in said supply section;
- a torso protection section contiguous to and extending froward from said supply section;
- said torso protection section having a front end and a rear end;
- a head protection section contiguous to and extending upward from said torso protection section;
- said head protection section having a front end and a rear end;
- preventing means for preventing said head protection section from pivoting toward said supply section during inflation thereof; and
- said preventing means includes depressed portions created by depressing said front end of said torso protection section inwardly toward said rear end of said side air bag and depressing said rear end of said head protection section inwardly toward said front end of said side air bag.

5. A side air bag as in claim 4 wherein said preventing means further comprises folding said depressed portions toward one another thereby creating folded sections, horizontal portions of said folded sections being substantially parallel to one another.

6. A side air bag comprising:
- a bag with a supply section;
- an inflator sealed in said supply section;
- a torso protection section contiguous to and extending froward from said supply section;
- a head protection section contiguous to and extending upward from said torso protection section;
- a plurality of fuse stitches within said side air bag; and
- a strength of said fuse stitches being low enough so that said fuse stitches are broken during inflation of said air bag, thereby creating a preventing means for preventing said head protection section from pivoting toward said supply section during inflation thereof.

7. A side air bag according to claim 6, further comprising an auxiliary section contiguous to and extending downward from at least one of said torso protection section and said head protection section.

8. A side air bag as in claim 6 wherein said fuse stitches are disposed horizontally at an approximate boundary between said torso protection section and said head protection section and further disposed horizontally at an approximate boundary between said torso protection section and said auxiliary section.

9. A side air bag as in claim 6 wherein said fuse stitches are disposed diagonally at an approximate boundary between said torso protection section and said head protection section and further disposed diagonally at an approximate boundary between said torso protection section and said auxiliary section.

10. A side air bag as in claim 7 wherein said side air bag is formed in a crank-shape and said fuse stitches include:
- at least one of a first and second fuse stitch;
- said first fuse stitch disposed vertically at an approximate boundary between said head protection section and said auxiliary section; and
- said second fuse stitch disposed horizontally at an approximate general boundary between said head protection section and said torso protection section.

11. A side air bag as in claim 7 wherein said fuse stitches are disposed horizontally at an approximate boundary between said torso protection section and said head protection section and further disposed horizontally at an approximate boundary between said torso protection section and said auxiliary section.

12. A side air bag as in claim 7 wherein said fuse stitches are disposed diagonally at an approximate boundary between said torso protection section and said head protection section and further disposed diagonally at an approximate boundary between said torso protection section and said auxiliary section.

13. A side air bag as in claim 7 wherein said fuse stitches comprise:
- a first, second and third fuse stitch extending partially over a cross section of said side air bag;
- said first fuse stitch disposed diagonally at an approximate boundary between said torso protection section and said head protection section;
- said second fuse stitch disposed horizontally at an approximate boundary between said torso protection section and said auxiliary section; and
- said third fuse stitch disposed diagonally and below said second fuse stitch.

14. A side air bag as in claim 7 wherein said side air bag is formed in a crank-shape and said fuse stitches comprise:
- a first, second and third fuse stitch;
- said first fuse stitch disposed diagonally at an approximate boundary between said torso protection section and said head protection section;
- said second fuse stitch disposed horizontally at an approximate boundary between said torso protection section and said auxiliary section; and
- said third fuse stitch disposed diagonally and below said second fuse stitch.

* * * * *